US012232621B1

(12) United States Patent
McCarville et al.

(10) Patent No.: US 12,232,621 B1
(45) **Date of Patent: *Feb. 25, 2025**

(54) COLLAPSIBLE AND PORTABLE SEATING APPARATUS

(71) Applicants: Robert McCarville, Omaha, NE (US); Kristen McCarville, Omaha, NE (US)

(72) Inventors: Robert McCarville, Omaha, NE (US); Kristen McCarville, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,125

(22) Filed: Jul. 25, 2023

Related U.S. Application Data

(63) Continuation of application No. 17/189,121, filed on Mar. 1, 2021, now Pat. No. 11,707,137, which is a continuation-in-part of application No. 16/933,880, filed on Jul. 20, 2020, now abandoned, which is a continuation of application No. 16/127,021, filed on Sep. 10, 2018, now Pat. No. 10,716,403.

(60) Provisional application No. 62/556,209, filed on Sep. 8, 2017.

(51) Int. Cl.

| | |
|---|---|
| ***A47C 11/00*** | (2006.01) |
| ***A47C 7/00*** | (2006.01) |
| ***A47C 7/62*** | (2006.01) |
| ***G09F 19/00*** | (2006.01) |
| *G09F 9/30* | (2006.01) |

(52) U.S. Cl.
CPC ........... *A47C 11/005* (2013.01); *A47C 7/006* (2013.01); *A47C 7/62* (2013.01); *G09F 19/00* (2013.01); *G09F 9/30* (2013.01)

(58) Field of Classification Search
CPC ......... A47C 11/005; A47C 7/006; A47C 7/62; G09F 19/00; G09F 9/30
See application file for complete search history.

(56) References Cited

U.S. PATENT DOCUMENTS

| | | | |
|---|---|---|---|
| 3,107,442 | A | 10/1963 | Harry |
| 3,337,262 | A | 8/1967 | Katzfey et al. |
| 3,366,415 | A | 1/1968 | Cooper |
| 3,477,760 | A | 11/1969 | Bue et al. |
| 3,511,532 | A | 5/1970 | Tringali et al. |
| 3,818,609 | A | 6/1974 | Woolman |
| 6,065,802 | A | 5/2000 | Bue |
| 6,830,294 | B2 | 12/2004 | Berthiaume |
| 7,611,193 | B2 | 11/2009 | Bue et al. |
| 7,922,245 | B1 | 4/2011 | Sawhney |
| 7,980,858 | B2 | 7/2011 | Valoe et al. |
| 10,716,403 | B1 | 7/2020 | McCarville et al. |

*Primary Examiner* — Mark R Wendell
(74) *Attorney, Agent, or Firm* — Suiter Swantz IP

(57) ABSTRACT

A collapsible and portable seating apparatus may include a seating assembly and a media mast with at least one image generation device. The seating assembly may be collapsible via at least one linkage assembly or pivot assembly, and portable via at least one wheel assembly. The media mast may be couplable to the seat assembly and removable to be set on a ground surface. The media mast may be portable when coupled to the seating assembly and/or separately portable in a hand-truck configuration when removed from the seating assembly. The media mast and/or the seating assembly may include components to provide increased stability and resistance against external and internal forces, where the components are deployed when the media mast is on the ground surface or the seating assembly is unfolded. A canopy may be couplable to the seating assembly.

20 Claims, 27 Drawing Sheets

COLLAPSIBLE AND PORTABLE SEATING APPARATUS

CROSS-REFERENCE TO RELATED APPLICATIONS

The present application is related to and claims benefit of the earliest available effective filing date from the following applications: the present application constitutes a continuation application of U.S. patent application Ser. No. 17/189,121, filed Mar. 1, 2021, which is a continuation-in-part application of U.S. patent application Ser. No. 16/933,880, filed Jul. 20, 2020, which is a continuation application of U.S. patent application Ser. No. 16/127,021, filed Sep. 10, 2018, which claims the benefit of U.S. Provisional Application Ser. No. 62/556,209, filed Sep. 8, 2017, which are each incorporated herein by reference in their entirety.

TECHNICAL FIELD

The present invention generally relates to seating and, more particularly, to a collapsible and portable seating apparatus.

BACKGROUND

In scenarios involving athletic coaching, academic teaching, healthcare instructing, and/or film production, the coaches, educators, instructors, and/or filmmakers may discuss potential strategies with other individuals during a select period (e.g., a time-out, a class, or the like). Often, the individuals may sit in chairs, while the coaches, educators, instructors, and/or filmmakers references material shown on a pad or a board. To reduce the amount of time it takes to set up the chairs and/or the board during the select period, multiple individuals may carry the chairs and/or push the pad or board out for the individuals and the coaches, educators, instructors, and/or filmmakers. This set-up can cost the coaches, educators, instructors, and/or filmmakers and the individuals time during the select period, and may require otherwise needed space to be reserved for the individuals carrying out the chairs to sit (e.g., on the side of the sports court or field). In addition, it is noted herein the pad or board is generally an analog device, and is limited in the information it can provide.

In addition, in scenarios where spacing and/or time does not allow for a full seating area, the pad or board may still be desirable as a standalone device for athletic coaching, academic teaching, healthcare instructing, and/or film production, although the pad or board is still generally an analog device, and is limited in the information it can provide.

As such, it would be desirable to provide an apparatus that addresses the limitations of the previous approaches provided above.

SUMMARY

A seating apparatus is disclosed, in accordance with one or more embodiments of the present disclosure. In one embodiment, the seating apparatus may include a media mast. In another embodiment, the media mast may include a tower including at least one tower section. In another embodiment, the media mast may include a media bracket assembly. In another embodiment, the media bracket assembly may include at least one device mount coupled to the tower. In another embodiment, the at least one device mount may be configured to receive at least one image generation device that is couplable to the at least one device mount. In another embodiment, the media mast may include at least one transportation or support assembly coupled to the tower. In another embodiment, the at least one transportation or support assembly may be configured to provide increased stability and resistance to the media mast against at least one applied force when the media mast is positioned on a ground surface. In another embodiment, the seating apparatus may include a seating assembly. In another embodiment, the seating assembly may include a frame. In another embodiment, the seating assembly may include a first seat and at least a second seat coupled to the frame. In another embodiment, the seating assembly may include at least one leg assembly coupled to the frame via at least one linkage assembly. In another embodiment, the at least one leg assembly is collapsible at the at least one linkage assembly. In another embodiment, the seating assembly may include at least one wheel assembly coupled to the frame via at least one pivot assembly. In another embodiment, the frame may be collapsible at the at least one pivot assembly. In another embodiment, the seating assembly may be portable via the at least one wheel assembly. In another embodiment, the seating assembly may include a media mast member coupled to the frame. In another embodiment, the media mast may be configured to be removable from and couplable to the media mast member.

A seating apparatus is disclosed, in accordance with one or more embodiments of the present disclosure. In one embodiment, the seating apparatus may include a media mast. In another embodiment, the media mast may include a tower including at least one tower section. In another embodiment, the media mast may include a media bracket assembly. In another embodiment, the media bracket assembly may include at least one device mount coupled to the tower. In another embodiment, the at least one device mount may be configured to receive at least one image generation device that is couplable to the at least one device mount. In another embodiment, the media mast may include at least one transportation or support assembly coupled to the tower. In another embodiment, the at least one transportation or support assembly may be configured to provide increased stability and resistance to the media mast against at least one applied force when the media mast is positioned on a ground surface. In another embodiment, the seating apparatus may include a seating assembly. In another embodiment, the seating assembly may include a frame. In another embodiment, the seating assembly may include a first seat and at least a second seat coupled to the frame. In another embodiment, the seating assembly may include at least one leg assembly coupled to the frame via at least one linkage assembly. In another embodiment, the at least one leg assembly is collapsible at the at least one linkage assembly. In another embodiment, the seating assembly may include at least one wheel assembly coupled to the frame via at least one pivot assembly. In another embodiment, the frame may be collapsible at the at least one pivot assembly. In another embodiment, the seating assembly may be portable via the at least one wheel assembly. In another embodiment, the seating assembly may include a media mast member coupled to the frame.

A media mast is disclosed, in accordance with one or more embodiments of the present disclosure. In one embodiment, the media mast may include a tower including at least one tower section. In another embodiment, the media mast may include a media bracket assembly. In another embodiment, the media bracket assembly may include at least one device mount coupled to the tower. In another embodiment, the at least one device mount may be configured to receive at least one image generation device that is couplable to the at least one device mount. In another embodiment, the media bracket assembly may include at least one electronics bracket coupled to the tower. In another embodiment, the at least one electronics bracket may be configured to receive one or more electrical components that are couplable to the at least one electronics bracket. In another embodiment, the one or more electrical components may be configured to power the at least one image generation device. In another embodiment, the media mast may include at least one transportation or support assembly coupled to the tower. In another embodiment, the at least one transportation or support assembly may be configured to provide increased stability and resistance to the media mast against at least one applied force when the media mast is positioned on the ground surface. In another embodiment, the media mast may be configured to be removable from and couplable to a media mast member installed on a seating assembly of a collapsible and portable seating apparatus.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
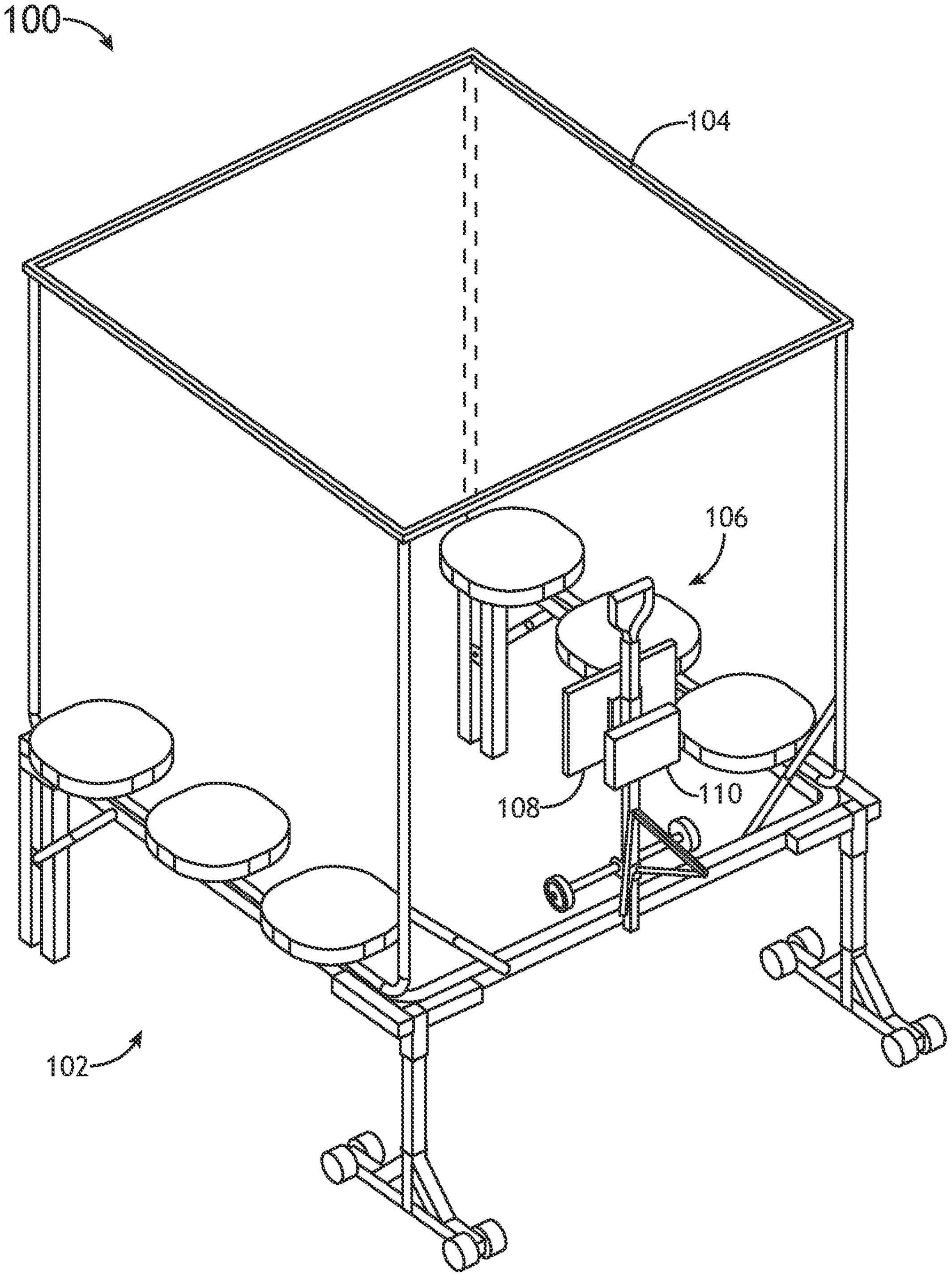
FIG. 1A illustrates a perspective view of a collapsible and portable seating apparatus, in accordance with one or more embodiments of the present disclosure.
Figure 1B:
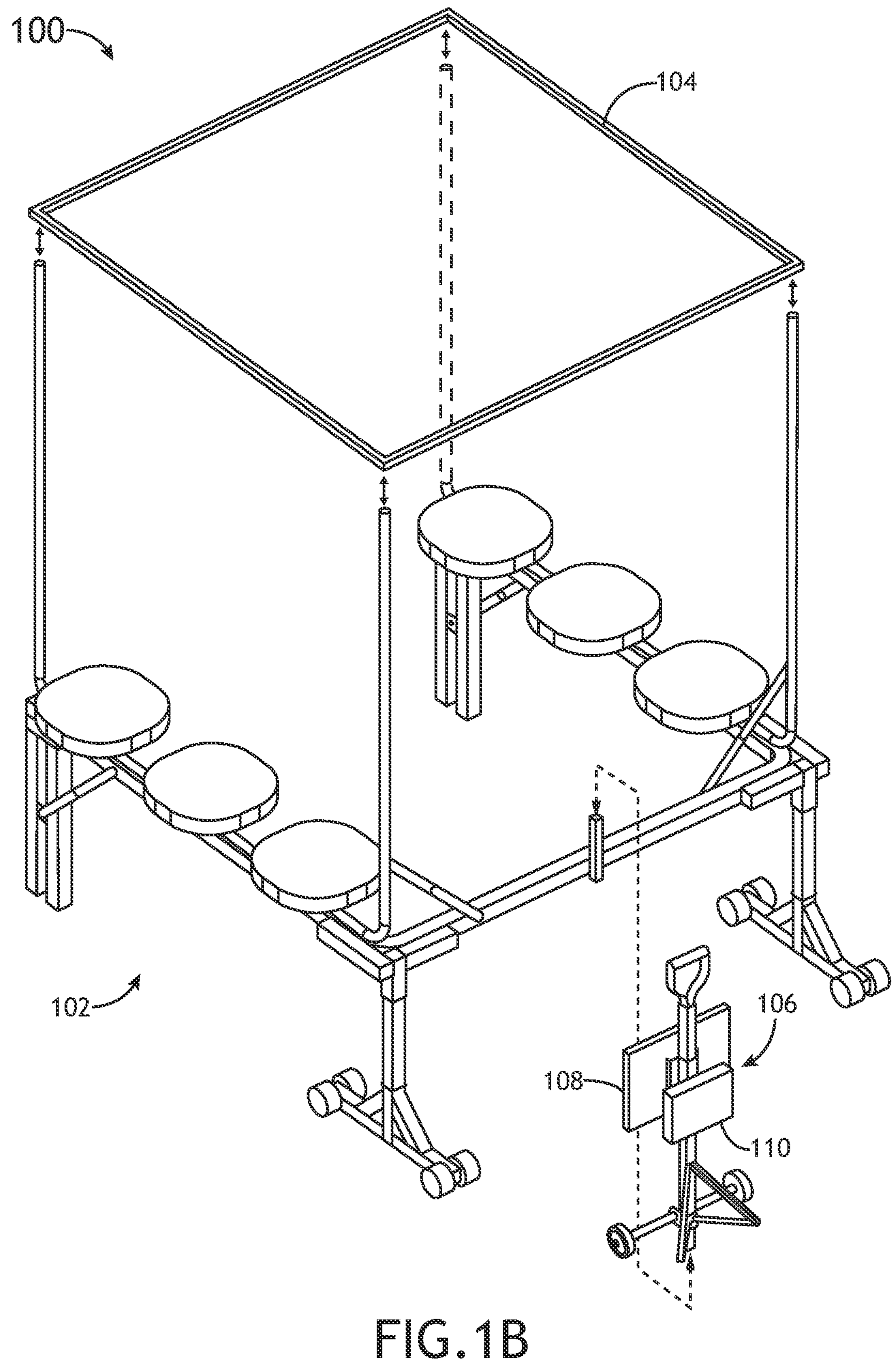
FIG. 1B illustrates a perspective view of a collapsible and portable seating apparatus, in accordance with one or more embodiments of the present disclosure.
Figure 1C:
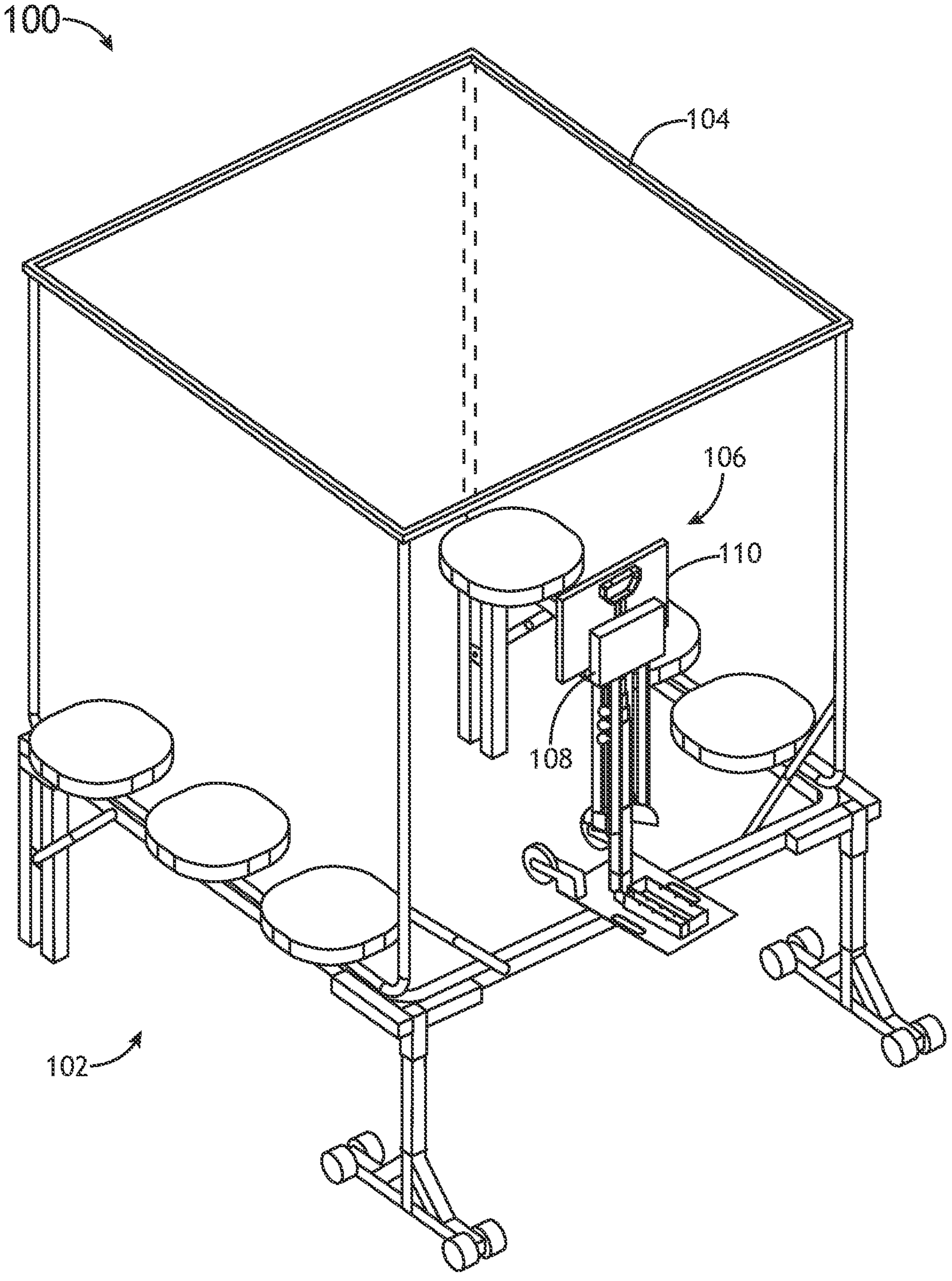
FIG. 1C illustrates a perspective view of a collapsible and portable seating apparatus, in accordance with one or more embodiments of the present disclosure.
Figure 1D:
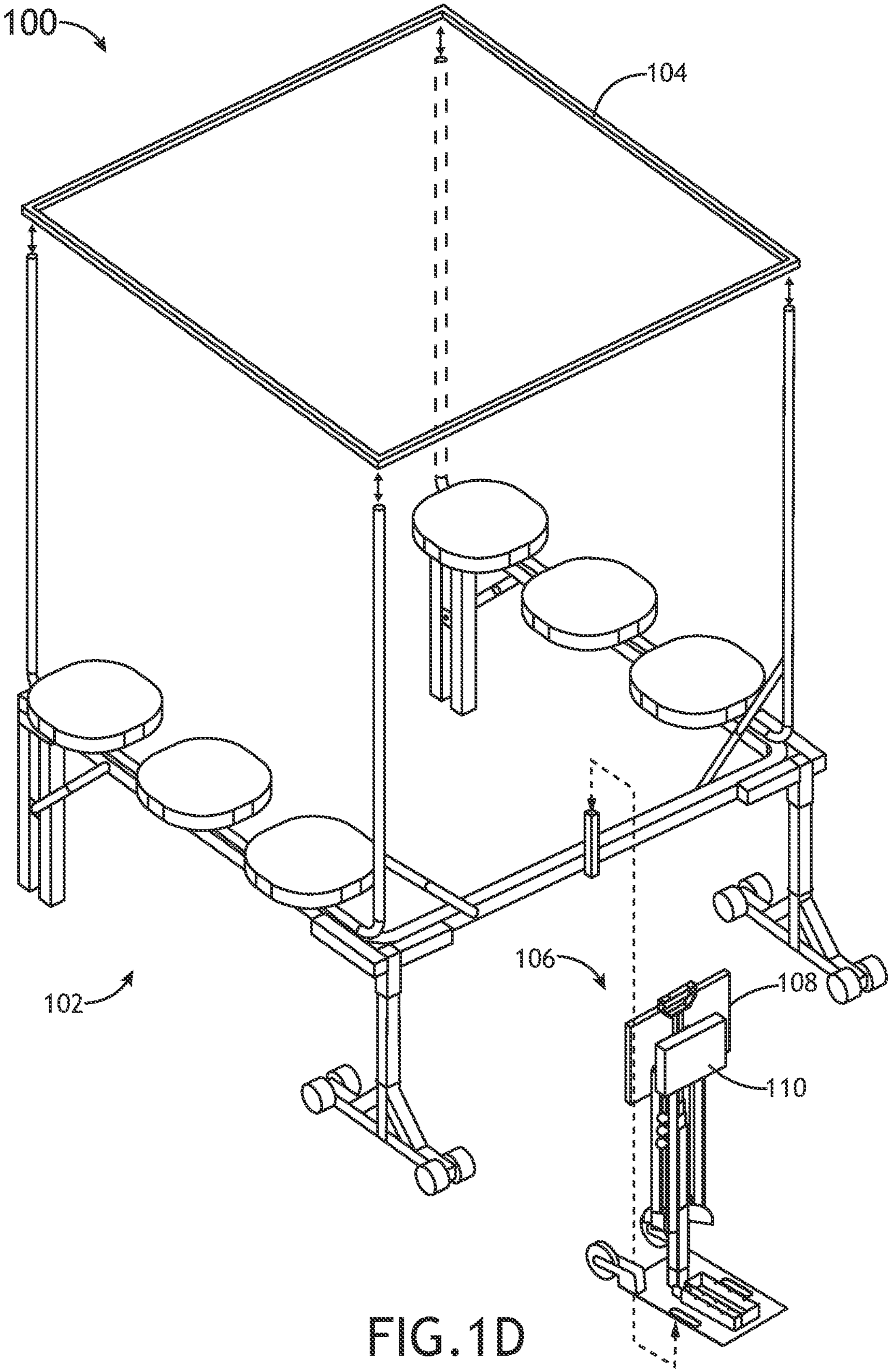
FIG. 1D illustrates a perspective view of a collapsible and portable seating apparatus, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

It is to be understood that both the foregoing general description and the following detailed description are exemplary and explanatory only and are not necessarily restrictive of the invention as claimed. Also, it is to be understood that the phraseology and terminology used herein is for the purpose of description and should not be regarded as limiting. The accompanying drawings, which are incorporated in and constitute a part of the specification, illustrate embodiments of the invention, and, together with the general description, serve to explain the principles of the invention.

FIGS. 1A-5D in general illustrate a collapsible and portable seating apparatus, in accordance with one or more embodiments of the present disclosure.

In scenarios involving athletic coaching, academic teaching, healthcare instructing, and/or film production, the coaches, educators, instructors, and/or filmmakers may discuss potential strategies with other individuals during a select period (e.g., a time-out, a class, or the like). Often, the individuals may sit in chairs, while the coaches, educators, instructors, and/or filmmakers references material shown on a pad or a board. To reduce the amount of time it takes to set up the chairs and/or the board during the select period, multiple individuals may carry the chairs and/or push the pad or board out for the individuals and the coaches, educators, instructors, and/or filmmakers. This set-up can cost the coaches, educators, instructors, and/or filmmakers and the individuals time during the select period, and may require otherwise needed space to be reserved for the individuals carrying out the chairs to sit (e.g., on the side of the sports court or field).

In addition, in scenarios where spacing and/or time does not allow for a full seating area, the pad or board may still be desirable as a standalone device for athletic coaching, academic teaching, healthcare instructing, and/or film production, although the pad or board is still generally an analog device, and is limited in the information it can provide.

Embodiments of the present disclosure are directed to a collapsible and portable seating apparatus usable in a variety of indoor and outdoor environments. For example, such environments may include, but are not limited to, indoor and/or outdoor sport events (e.g., basketball games, football games, soccer games, lacrosse games, or the like). By way of another example, such environments may include non-sports contexts such as, but not limited to, educational and academic settings, medical and healthcare settings, film production, or the like. Embodiments of the present disclosure are also directed to the seating apparatus including a seating assembly, a removable media mast, and a removable canopy.

Embodiments of the present disclosure are also directed to the processes of folding and/or expanding the seating apparatus, storage of the seating apparatus, removing and/or adding components (e.g., the media mast, the canopy, or the like) to the seating assembly of the seating apparatus.

In one aspect, the collapsible and portable seating apparatus is collapsible and/or foldable from a stowable or transportable form to a deployed or operational form. For example, the seating apparatus may collapse into a stowable or transportable form, which reduces the seating apparatus to a fraction of the original footprint of the seating apparatus and results in less space necessary to stow and/or transport the seating apparatus. In another aspect, the seating apparatus is transformable between the stowable or transportable form and the deployed or operational form via a single user (e.g., coach, player, event holder, event attendee, teacher, student, medical professional, patient, filmmaker, acter, or the like). In another aspect, the collapsible and portable seating apparatus is movable and/or portable from a storage location (e.g., either long-term or short-term) to a location of deploying or operation via the single user. In this regard, the seating apparatus as a whole and/or actuatable components of the seating apparatus may be fabricated from materials which a single user may be able to reasonably act upon to transition between the stowable or transportable form and the deployed or operational form.

In another aspect, the media mast may be installable and removable from the seating apparatus such that the media mast and the seating apparatus may be used together or independently of one another (e.g., used with coupled together, used when uncoupled, one being used while the other remains in storage, or the like). In another aspect, the canopy may be installable and removable from the seating apparatus such that the canopy and the seating apparatus may be used together or independently of one another (e.g., used with coupled together, used when uncoupled, one being used while the other remains in storage, or the like).

Embodiments of the present disclosure are also directed to the media mast that may be operated as a standalone device without the seating assembly and/or the removable canopy. The media mast may be self-contained with all necessary electrical components capable of providing power, generating images, or other electrical-based operations. The media mast may be collapsible into a hand-truck configuration, or supported via one or more support assemblies, and/or may be portable via the one or more transportation assemblies, where the one or more support assemblies and the one or more transportation assemblies may be separate or integrated together.

FIGS. 1A-1D illustrate a collapsible and portable seating apparatus 100, in accordance with one or more embodiments of the present disclosure. It is noted herein "collapsible and portable seating apparatus" and variants of the phrase including, but not limited to, "seating apparatus" may be considered equivalent, for purposes of the present disclosure.

In one embodiment, the seating apparatus 100 includes a seating assembly 102. The seating assembly 102 may be collapsible between a stowable or transportable position and one or more operational positions. The seating assembly 102 may be stowed when in the stowable or transportable position. The seating assembly 102 may be portable when in the stowable or transportable position, and/or when in an operational position of the one or more operational positions.

In another embodiment, the seating apparatus 100 includes a canopy 104. The canopy 104 may include one or more layers of a material. For example, the material may be collapsible (e.g., a fabric, a sectioned piece of plastic or metal, or the like). By way of another example, the material may be rigid (e.g., a solid piece of plastic or metal, or the like). The canopy 104 may be removable from and/or couplable to the seating assembly 102. The canopy 104 may be portable. For example, the canopy 104 may be portable independent of the seating assembly 102. By way of another example, the canopy 104 may be portable when coupled to the seating assembly 102. In general, the canopy 104 may be any shade-producing device known in the art including, but not limited to, a cover, a tarp, an umbrella, or the like.

In another embodiment, the seating apparatus 100 includes one or more media masts 106. The one or more media masts 106 may be collapsible between a stowable or transportable position and one or more operational positions. At least one dimension of the one or more media masts 106 may be adjustable when in the stowable or transportable position and/or the one or more operational positions. The one or more media masts 106 may be removable from and/or couplable to the seating assembly 102 when in the stowable or transportable position. The one or more media masts 106 may be portable when in the stowable or transportable position, and/or when in an operational position of the one or more operational positions. For example, the one or more media masts 106 may be portable independent of the seating assembly 102. By way of another example, the one or more media masts 106 may be portable when coupled to the seating assembly 102.

It is noted herein the seating assembly 102 and the media mast 106 may each be considered in a stowable or transportable form when the media mast 106 is coupled to the seating assembly 102 or when the media mast 106 is separately stowed or transported from the seating assembly 102. In this regard, the media mast 106 need not be coupled to the seating assembly 102 for the seating apparatus 100 to be in a stowable or transportable form.

In addition, it is noted herein the seating assembly 102 and the media mast 106 may each be considered in an operational form when the media mast 106 is coupled to the seating assembly 102 or when the media mast 106 is set on a ground surface proximate to the seating assembly 102. In this regard, the media mast 106 need not be coupled to the seating assembly 102 for the seating apparatus 100 to be in an operational form.

In another embodiment, the seating apparatus 100 includes one or more image generation devices 108. For example, the one or more image generation devices may include, but are not limited to, one or more displays or display devices, one or more projectors, or the like. For example, the one or more image generation devices 108 may be coupled to the media mast 106 either directly or indirectly via brackets, linkage assemblies, frame assemblies, or the like. By way of another example, the one or more image generation devices 108 may be coupled to the canopy 104 either directly or indirectly via brackets, interlocking assemblies, linkage assemblies, frame assemblies, fasteners, an adhesive, or the like. By way of another example, the one or more image generation devices 108 may be coupled to the seating assembly 102 either directly or indirectly via brackets, interlocking assemblies, linkage assemblies, frame assemblies, fasteners, an adhesive, or the like.

It is noted herein the one or more image generation devices 108 may be mounted on the seating apparatus 100 at an angle to (e.g., orientated substantially perpendicular to) the users in the seating assembly 102. In addition, it is noted herein the one or more image generation devices 108 may be mounted on the seating apparatus 100 such that the one or more image generation devices 108 are at a selected height from the ground (e.g., a height for comfortable viewing by users sitting on the seating assembly 102). In another embodiment, the one or more image generation devices 108 and/or the one or more components of the seating apparatus 100 to which the one or more image generation devices 108 are coupled are articulatable to allow height and/or viewing angle adjustment.

In another embodiment, the one or more image generation devices 108 include a user interface. The user interface may include one or more display devices. The user interface may include one or more user input devices.

The display device may include any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, wireline/wireless linked tablet, and the like) is suitable for implementation in the seating apparatus 100.

The user input device may include any user input device known in the art. For example, the user input device may include, but is not limited to, a touchscreen of a mobile communication device (e.g., tablet, smartphone, ultrabook, etc.) communicatively coupled with the display device, a touchscreen of a display device, a digital pen interactable with a display device, a digital pen interactable with a mobile communication device communicatively coupled with the display device, a keyboard, a keypad, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the seating apparatus 100. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

The one or more display devices may receive digital marking information via a user interface (e.g., tablet, smartphone, a digital pen, etc.). For example, the one or more display devices may be communicatively coupled/couplable to the user input device. For instance, the one or more display device may be coupled to the user input devices via a wireline and/or wireless data link. In the case of a wireless communication link, the display device and the user input device may be communicatively coupled via any wireless protocol known in the art, such as, but not limited to, Low Energy Blue Tooth, WiFi, and etc.

The one or more image generation devices 108 may include a markable surface. In general, the markable surface may include, but is not limited to, a whiteboard surface, a chalkboard surface, a glass surface, a paper pad, a digital surface, or the like. The one or more image generation devices 108 may include a markable surface over the display device of the one or more image generation devices 108. For example, the display device may be embedded underneath and visible through the markable surface (e.g., the markable surface is a cleanable glass surface, or the like), such that a user may effectively mark the display device by marking on the markable surface. In this regard, the markable surface may act as an overlay over the display device, allowing a user to make markings on the markable surface with reference to pictorial/video data presented beneath the markable surface on a screen of the display device. By way of another example, the display device may be embedded within the markable surface such that a surface of the display device and the markable surface are substantially flush. By way of another example, the display device may be embedded within the markable surface such that the display device is inset within the markable surface a selected depth. It is noted herein, however, the one or more image generation devices 108 may not include a display device, such that the one or more image generation devices 108 include only a markable surface.

In another embodiment, the one or more image generation devices 108 includes a controller. The controller may include one or more processors and memory, where the one or more processors are configured to execute a set of program instructions stored in memory, where the set of program instructions configured to cause the one or more processors to carry out various steps/functions as described throughout the present disclosure.

The controller may be communicatively coupled to one or more components of the seating apparatus 100. For example, the controller may be communicatively coupled, either directly or indirectly, to the user interface (e.g., the display device and/or the user input device), the markable surface, or the like. In another, the controller may be integrated within the user interface (e.g., the display device and/or the user input device), the markable surface, or the like.

The controller may be configured to receive and/or acquire data or information from other systems or subsystems (e.g., one or more sets of information from the user interface (e.g., the display device and/or the user input device), the markable surface, or the like) of the seating apparatus 100 by a transmission medium that may include wireline and/or wireless portions. The controller may additionally be configured to transmit data or information (e.g., the output of one or more procedures of the inventive concepts disclosed herein) to one or more systems or subsystems (e.g., one or more sets of information from the user interface (e.g., the display device and/or the user input device), the markable surface, or the like) of the seating apparatus 100 by a transmission medium that may include wireline and/or wireless portions. In this regard, the transmission medium may serve as a data link between the controller and the other subsystems of the seating apparatus 100. Additionally, the controller may be configured to send data to external systems via a transmission medium (e.g., network connection).

The one or more processors may include any one or more processing elements known in the art. In this sense, the one or more processors may include any microprocessor device configured to execute algorithms and/or program instructions. For example, the one or more processors may consist of a desktop computer, mainframe computer system, workstation, image computer, parallel processor, handheld computer (e.g. tablet, smartphone, or phablet), or other computer system (e.g., networked computer) configured to cause the apparatus 100 to perform one or more of the various steps described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute the one or sets of program instructions from a non-transitory memory medium (e.g., the memory). Moreover, different subsystems of the seating apparatus 100 (e.g., one or more sets of information from the user interface (e.g., the display device and/or the user input device), the markable surface, or the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing the one or more sets of program instructions executable by the associated one or more processors to carry out the various steps described throughout the present disclosure. For example, the memory may include a non-transitory memory medium. For instance, the memory may include, but is not limited to, a read-only memory, a random access memory, a magnetic or optical memory device (e.g., disk), a magnetic tape, a solid state drive, and the like. The memory may be configured to provide display information to a display device of a user interface and/or the output of the various steps described throughout the present disclosure. The memory may additionally be configured to store user input information from a user input device of the user interface and/or the input from the various steps described throughout the present disclosure. The memory may be housed in a common controller housing with the one or more processors. The memory may, alternatively or in addition, be located remotely with respect to the physical location of the processors and/or the controller. For instance, the one or more processors and/or the controller may access a remote memory (e.g., server), accessible through a network (e.g., internet, intranet and the like).

It is noted herein, where the one or more image generation devices 108 include a projector that is configured to display content on a backdrop, where the backdrop sits separate from the seating apparatus 100 or is coupled to the seating apparatus 100 a select projection distance from the projector. It is noted herein the one or more image generation devices 108 may be replaced with, or used as, a backdrop for the projector, where the projector sits separate from the seating apparatus 100 or is coupled to the seating apparatus 100 a select projection distance from the backdrop.

It is noted herein the one or more image generation devices 108 may be coupled to one or more servers, allowing for one or more remote or external computing devices to connect with the one or more image generation devices 108. For example, the one or more remote or external computing devices may receive from and/or transmit information to the one or more image generation devices 108, troubleshoot and/or update the one or more image generation devices 108, or the like.

In another embodiment, the seating apparatus 100 includes one or more electrical components or connections 110 configured to provide power to the seating apparatus 100. For example, the seating apparatus 100 may be operated via one or more electrical power sources including, but not limited to, battery source, a grid-based electrical power source, or an electrical generator, such as a gas-powered electrical generator, a solar-powered generator, a wind-powered generated, and the like. For instance, the one or more electrical components or connections 110 may include a power supply (e.g., battery pack) that is chargeable through connection to an external electrical grid, through solar panels onboard (e.g., installed on the seating assembly 102, the canopy 104, the media mast 106, or the like) the seating apparatus 100, or the like. In another embodiment, the apparatus 100 includes components necessary for heating and/or cooling any of the components of the apparatus, including, but not limited to, the seating assembly 102 or the one or more image generation devices 108. For example, the seating assembly 102 or the one or more image generation devices 108 may be equipped with one or more heater units (e.g., resistive heating elements) or one or more cooling elements (e.g., Peltier devices, fans, water cooling coils, etc.) By way of another example, the seating apparatus 100 may include slots within the one or more image generation devices 108 to provide airflow to components of the one or more image generation devices 108.

FIGS. 2A-21 in general illustrate example embodiments of the seating assembly 102 and the canopy 104, in accordance with one or more embodiments of the present disclosure.

In one embodiment, the seating assembly 102 includes one or more sets 200 of seats 202. For example, a set 200 may include 1, 2, . . . up to an N number of seats 202. For instance, a set 200 may include three seats 202. In addition, the seating assembly 102 may include up to sixteen seats 202 separated into defined sets 200 or dispersed at random locations around the media mast 106. Further, the seating assembly 102 may be modular to allow for the addition and/or removal of seats 202. Where the seating assembly 102 includes multiple sets 200 of seats 202, the multiple sets 200 may be arranged to leave or create an open space between the seats 202. For example, users of the seating assembly 202 may enter the open space to sit on the seats 202 and/or step over the seats 202.

The one or more seats 202 may be substantially flat surfaces. The he one or more seats 202 may include one or more contours and/or depressions, where the contours and/or depressions are configured to conform to a user. In general, the one or more seats 202 may be of any shape known in the art (e.g., circular, rectangular, or the like). It is noted herein one or more cushions may be coupled to the one or more seats 202.

In another embodiment, the seating assembly 102 includes a frame 204. For example, the one or more seats 202 may be coupled to the frame 204 via one or more seat posts 206. It is noted herein, however, the one or more seats 202 may be coupled directly to the frame 204, such that the one or more seat posts 206 are not necessary. Where the seating assembly 102 includes multiple sets 200 of seats 202, the frame 204 may be designed to leave or create an open space between the seats 202. For example, the frame 204 may be U-shaped, having an open side in which users of the seating assembly 202 may enter the open space to sit on the seats 202. It is noted herein the open space may include one or more additional devices positionable between the sets 200 of seats 202. For example, a table or other substantially flat platform may be positionable between the sets 200 of seats 202. By way of another example, a fire pit, grill, barbecue, or other backyard/patio accessory may be positionable between the sets 200 of seats 202.

In general, the frame 204 may be fabricated from one or more frame members. Where there are multiple frame members, the multiple frame members may be coupled together via welding or other manufacturing process, fasteners (e.g., screws; nuts, washers, and bolts; hitch and cotter pins; spring-loaded pistons; or the like), brackets, an adhesive, or the like. The one or more frame members of the frame 204 and/or the one or more seat posts 206 may include any cross-section known in the art. For example, the one or more frame members of the frame 204 and/or the one or more seat posts 206 may include, but are not limited to, a circular cross-section, an elliptic cross-section, a polygonal cross-section (e.g., square, rectangle, triangle, hexagonal, etc.), or the like. By way of another example, the one or more frame members of the frame 204 and/or the one or more seat posts 206 may include, but are not limited to, a hollow cross-section or a solid cross-section.

The sets 200 of seats 202 may be configured to actuate with the frame 204 when the seating assembly 102 transitions between a stowable or transportable form and an operational form. For example, the seats 202 may have seating plane that is parallel (or substantially parallel) to a horizontal (or substantially horizontal) plane of the frame 204, and the seats 202 may maintain an angle relationship with the frame 204 as the seating assembly transitions between a stowable or transportable form and an operational form.

The frame 204 may include one or more wheels positioned within one or more frame members. For example, the one or more wheels may face outward from the frame members to allow the seating assembly 102 to be transported on its side (e.g., as opposed to being transported in a collapsed, upright form). The one or more wheels may be fixed in place by brackets coupled to the one or more frame members or directly to the one or more frame members. The one or more wheels may be retractable against the one or more frame members or within the one or more frame members when the seating assembly 102 is in an operational form or in a stowed position. It is noted herein the retractable wheels are not limited to the seating assembly 102, but may be incorporated in any standing or seating assembly or device with a sub-frame (e.g., foldable tables, park benches, bleachers, stage risers, or the like).

In another embodiment, the seating assembly 102 includes one or more leg assemblies 208. The one or more leg assemblies 208 may be coupled to the frame 204 via a linkage assembly 210. The one or more leg assemblies 208 may be actuatable between a stowable or transportable position and one or more operational positions. For example, the linkage assembly 210 may include one or more linkages coupled together via a hinge assembly causing the linkages to actuate when the leg assembly 208 actuates between the one or more operational positions and the stowable or transportable position. By way of another example, the linkage assembly 210 may include a slide or track, along which a runner or pin may actuate when the leg assembly 208 actuates between the one or more operational positions and the stowable or transportable position.

In another embodiment, the one or more leg assemblies 208 include one or more legs 212. For example, the linkage assembly 210 may be directly or indirectly coupled to the one or more legs 212.

The one or more leg assemblies 208 may be configured to actuate relative to the frame 204 when the seating assembly 102 transitions between the stowable or transportable form and the operational form. For example, the one or more leg assemblies 208 may be configured to rotate about an axis and/or translate to fold against or unfold from the frame 204 when the seating assembly 102 transitions between the stowable or transportable form and the operational form. The one or more legs 212 may be configured to come into contact with the frame 204. For example, the frame 204 may sit on at least a portion of the one or more legs 212 when the seating assembly 102 is in an operational position. By way of another example, at least a portion of the one or more legs 212 may be in contact with the frame 204 when the seating assembly 102 is in the stowable or transportable position. It is noted herein, however, the one or more legs 212 may be spaced a select distance from the frame 204 when the seating assembly 102 is in the stowable or transportable position.

In addition, it is noted herein the one or more leg assemblies 208 may include one or more wheels coupled to the one or more legs 212. Here, the wheels may be fixed in place by brackets coupled to the one or more legs 212, or may be retractable against the one or more legs 212 or within the one or more legs 212 when the one or more leg assemblies 208 are in a stowed position. In this instance, the one or more leg assemblies 208 may be considered wheel assemblies or wheeled assemblies, for purposes of the present disclosure.

Figure 2A:
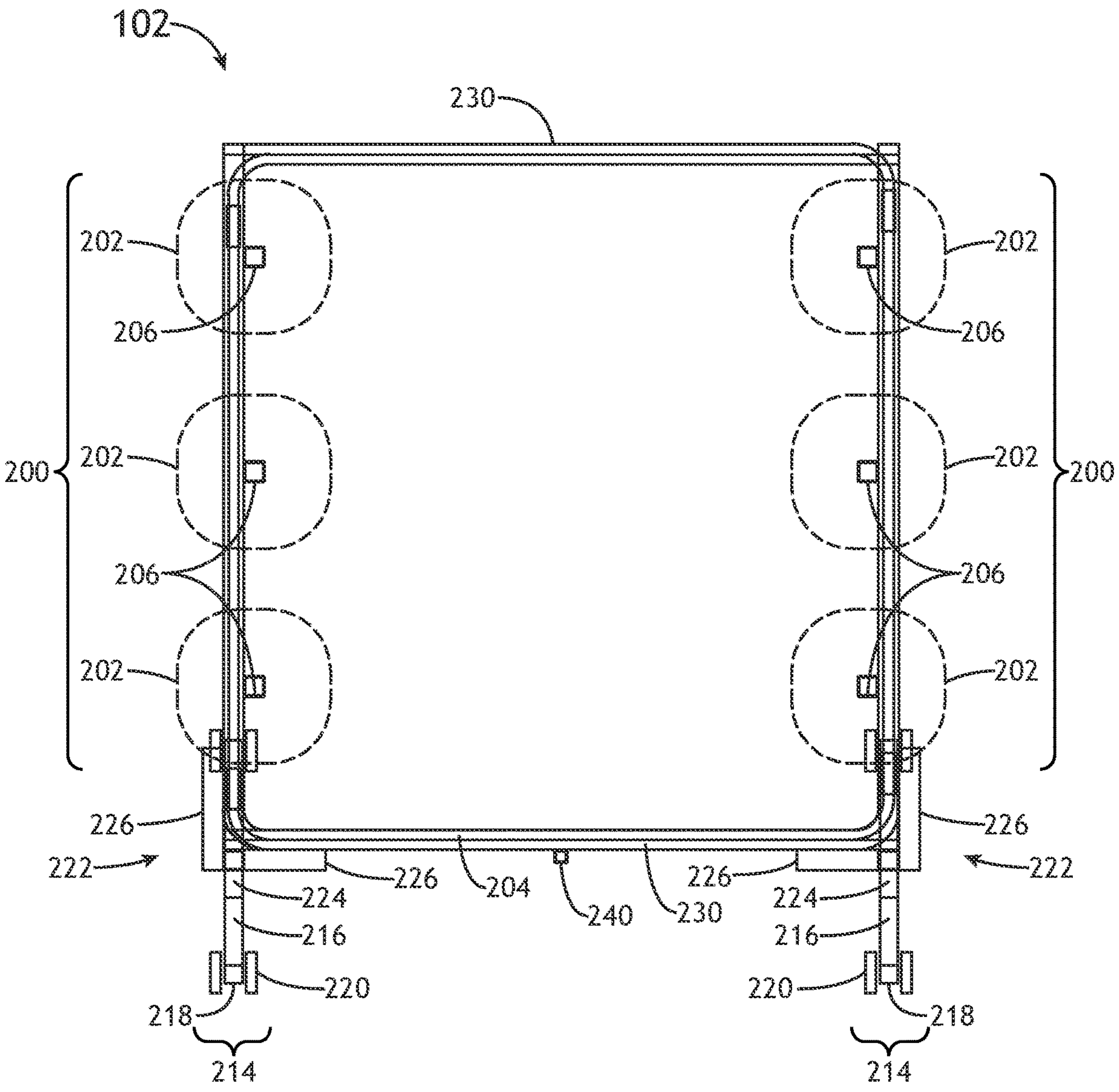
FIG. 2A illustrates a rear elevation view of a seating assembly of a collapsible and portable seating apparatus in a stowable or transportable position, in accordance with one or more embodiments of the present disclosure.
Figure 2B:
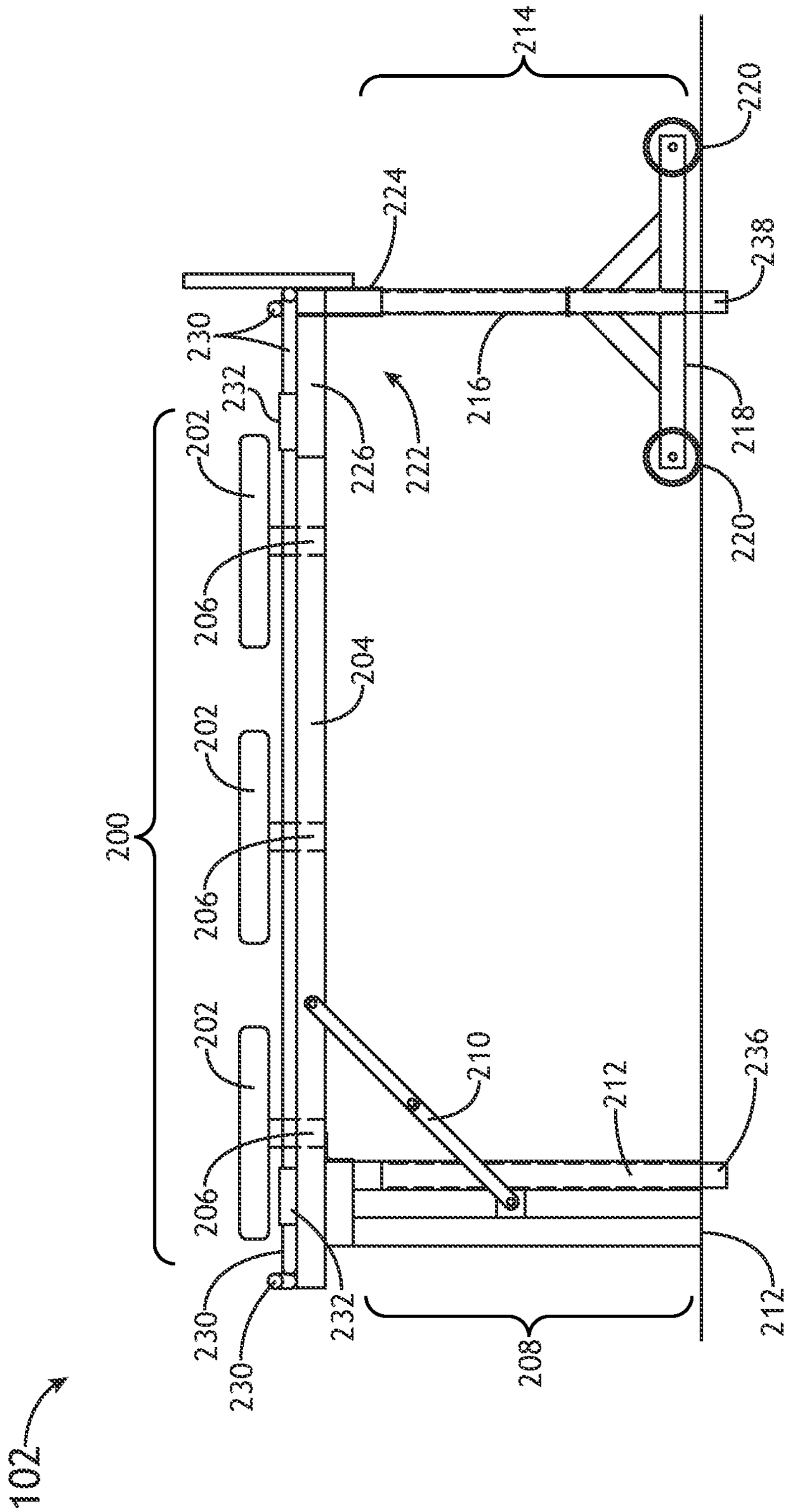
FIG. 2B illustrates a side view of a seating assembly of a collapsible and portable seating apparatus in an operational position, in accordance with one or more embodiments of the present disclosure.
Figure 2C:
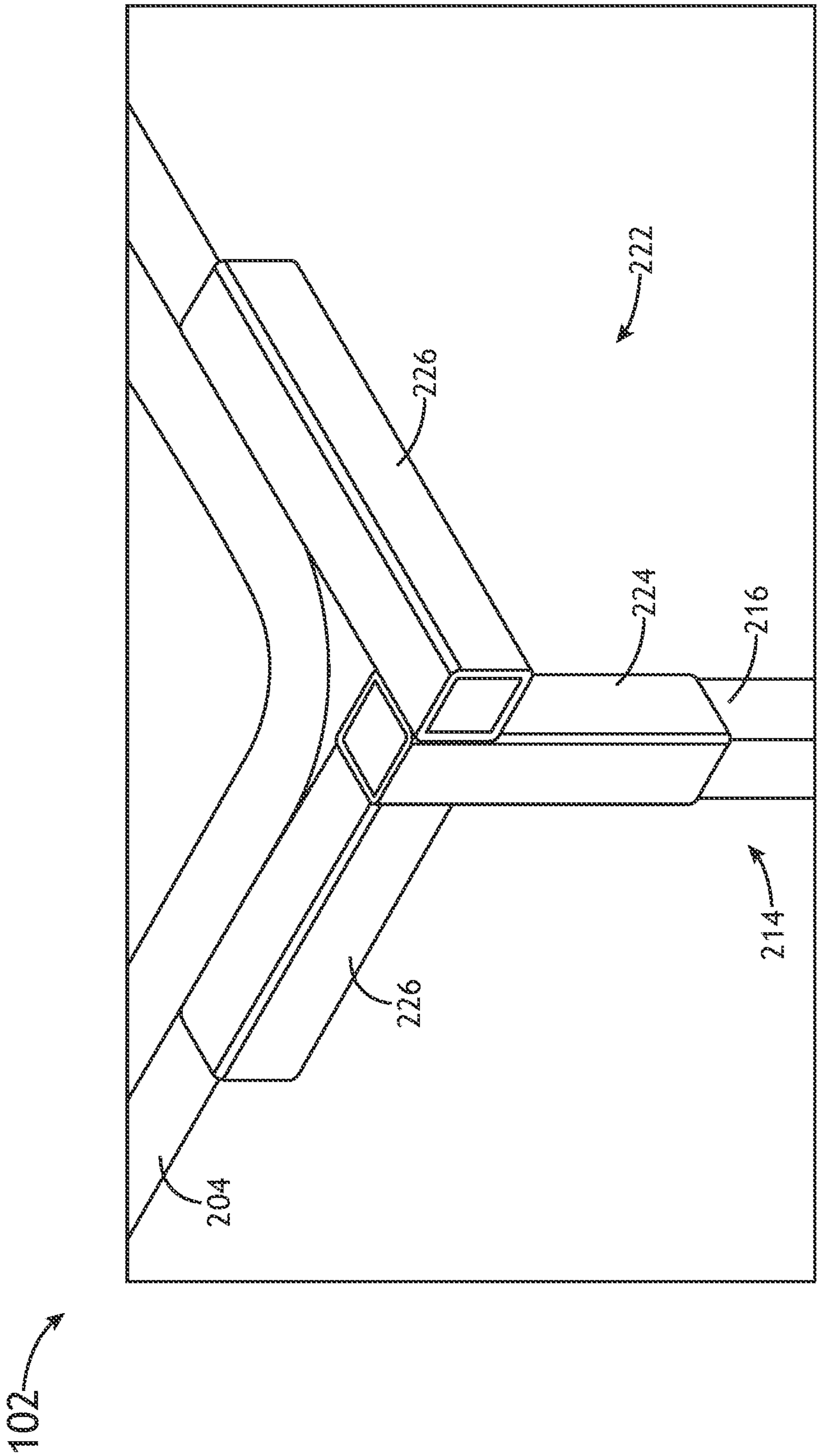
FIG. 2C illustrates a perspective view of portions of a seating assembly of a collapsible and portable seating apparatus, in accordance with one or more embodiments of the present disclosure.
Figure 2D:
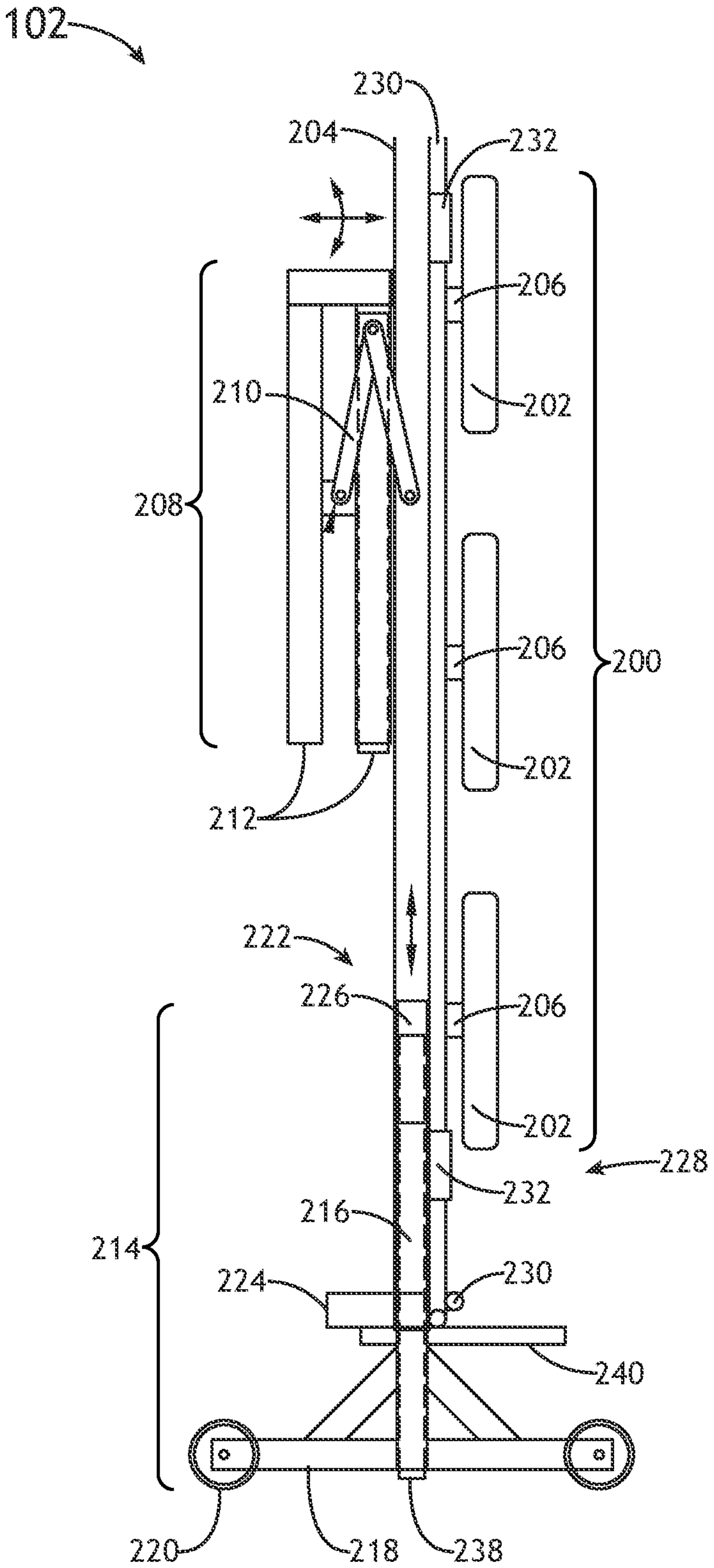
FIG. 2D illustrates a side view of a seating assembly of a collapsible and portable seating apparatus in a stowable or transportable position, in accordance with one or more embodiments of the present disclosure.

In another embodiment, the seating assembly 102 includes one or more wheel assemblies 214. The one or more wheel assemblies 214 may include one or more legs 216. The one or more wheel assemblies 214 may include one or more members 218 coupled to the one or more legs 216. The one or more wheel assemblies 214 may include one or more wheels 220 coupled to the one or more members 218. It is noted herein the one or more wheels 220 may be fixed in place by the one or more members 218, or may be retractable against the one or more members 218 or within the one or more members 218 when the frame 204 is uncoupled from the one or more wheel assemblies 214 (e.g., as illustrated in FIGS. 2D versus 2E). In this regard, the seating apparatus 100 may be transported and/or stowed in a collapsed or an expanded (e.g., uncollapsed) form via the one or more wheel assemblies 214 with a reduced amount of effort from a user.

The frame 204 may be configured to actuate relative to the one or more wheel assemblies 214 when the seating assembly 102 transitions between the stowable or transportable form and the operational form. For example, the frame 204 may be configured to rotate about an axis and/or translate to fold against or unfold from the one or more wheel assemblies 214 when the seating assembly 102 transitions between the stowable or transportable form and the operational form. For instance, the one or more wheel assemblies 214 may be removable from and/or coupled to the frame 204 via a pivot assembly 222. The one or more wheel assemblies 214 may be actuatable between a stowable or transportable position and one or more operational positions. For example, as illustrated in FIG. 2C, the pivot assembly 222 may include one or more primary members 224 which couple to a leg 216 of a wheel assembly 214 and one or more auxiliary members 226 which couple to the frame 204. For instance, the one or more primary members 224 may pivot about an axis through at least one of the one or more auxiliary members 226 when the seating assembly 102 actuates between the one or more operational positions and the stowable or transportable position.

Figure 2E:
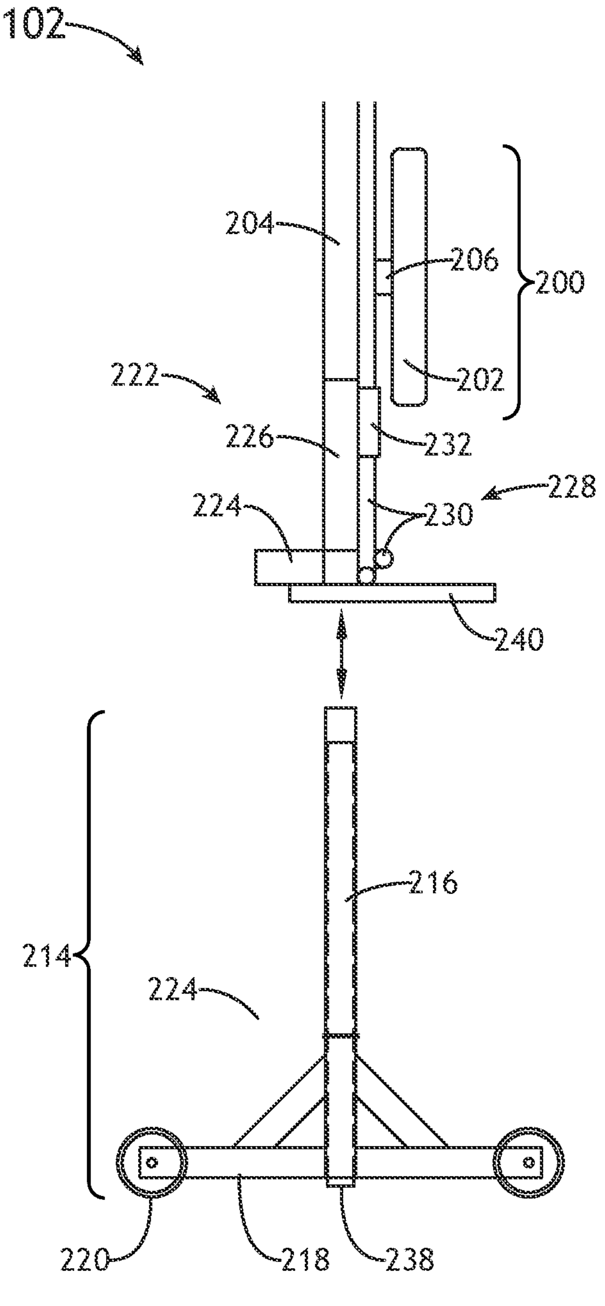
FIG. 2E illustrates a side view of portions of a seating assembly of a collapsible and portable seating apparatus in a stowable or transportable position, in accordance with one or more embodiments of the present disclosure.

It is noted herein the one or more members 218 may include a baseplate. In addition, it is noted herein the one or more wheel assemblies 214 may not include the one or more wheels 220. In this instance, the one or more wheel assemblies 214 may be considered leg assemblies, for purposes of the present disclosure It is noted herein at least FIG. 2B illustrates a portion of the seating assembly 102 in an operational position, while FIGS. 2D and 2E illustrates a portion of the seating assembly 102 in a stowable or transportable position. In addition, it is noted herein at least FIG. 2D illustrates the one or more wheel assemblies 214 being coupled to the frame 204 via the pivot assembly 222, while at least FIG. 2E illustrates the one or more wheel assemblies 214 being removed from the pivot assembly 222.

It is noted herein the seating assembly 102 may include one or more lock assemblies to keep the seating assembly 102 in an operational form and/or in a stowable or transportable form.

In another embodiment, the seating assembly 102 includes one or more canopy support assemblies 228. A canopy support assembly 228 may include one or more canopy supports 230. Each of the one or more canopy supports 230 may be coupled to the frame 204 via one or more brackets 232, within which the one or more canopy supports 230 may actuate between one or more operational positions and a stowable or transportable position. For example, the seating assembly 102 may include a first canopy support 230 coupled to the frame 204 via a first set of brackets 232 and a second canopy support 230 coupled to the frame 204 via a second set of brackets 232. For instance, where the seating assembly 102 includes multiple sets 200 of seats 202, the one or more canopy supports 230 may rotate about an axis through the one or more brackets 232 inward, enclosing the open space between the multiple sets 200 of seats 202. It is noted herein the canopy support 230 may be enclosed, may be U-shaped, or may be a straight member.

The one or more canopy supports 230 may include any cross-section known in the art. For example, the one or more canopy supports 230 may include, but are not limited to, a circular cross-section, an elliptic cross-section, a polygonal cross-section (e.g., square, rectangle, triangle, hexagonal, etc.), or the like. By way of another example, the one or more canopy supports 230 may include, but are not limited to, a hollow cross-section or a solid cross-section.

In another embodiment, the one or more canopy support assemblies 228 include one or more canopy linkage assemblies 234. For example, a canopy support 230 may be coupled to the frame 204 via a canopy linkage assembly 234. For instance, the canopy linkage assembly 234 may include one or more linkages coupled together via a hinge assembly causing the linkages to actuate when the canopy support 230 actuates between the one or more operational positions and the stowable or transportable position. By way of another example, the canopy linkage assembly 234 may include a slide or track, along which a runner or pin may actuate when the canopy support 230 actuates between the one or more operational positions and the stowable or transportable position.

Figure 2F:
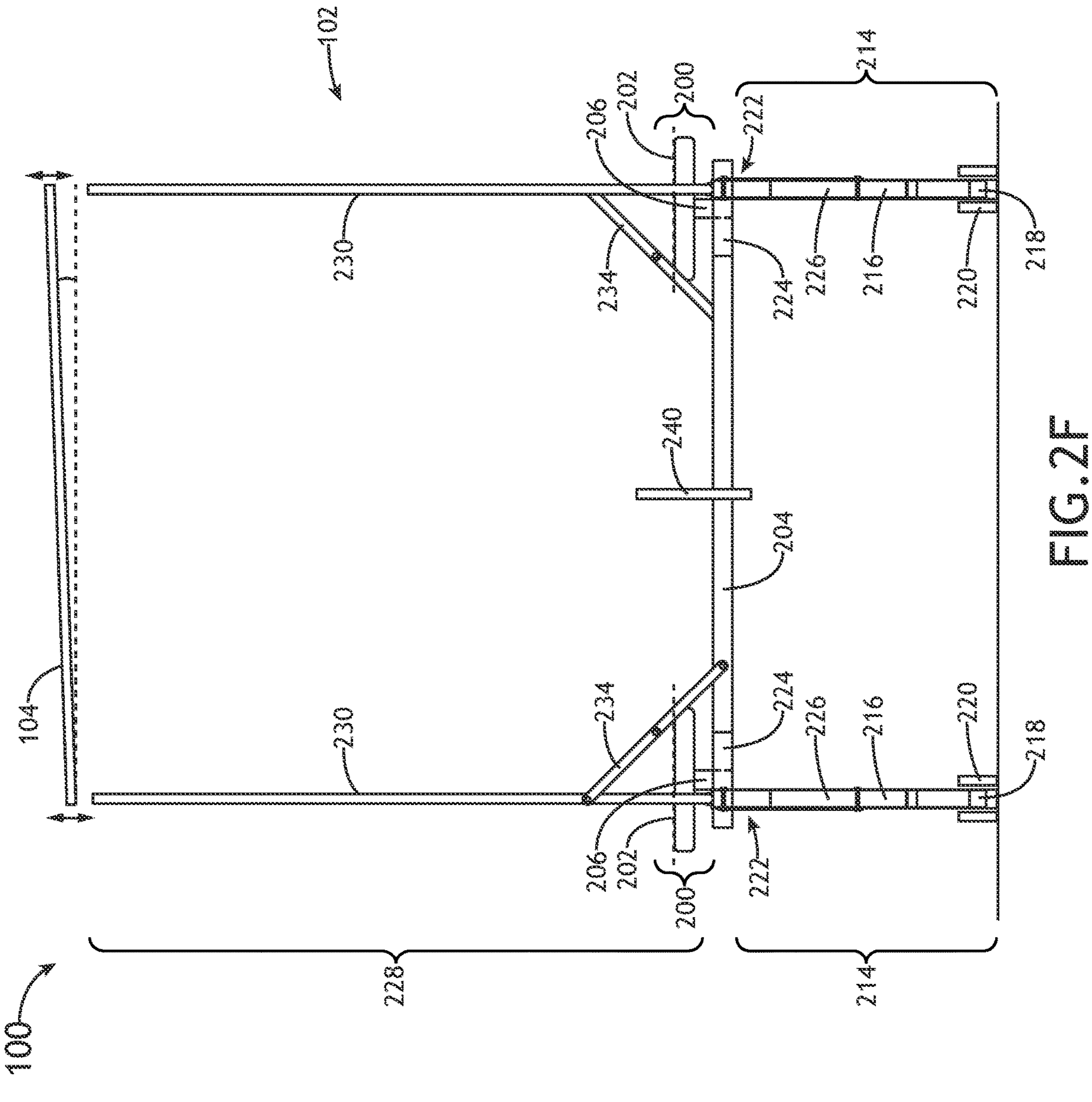
FIG. 2F illustrates a rear elevation view of a seating assembly and a canopy of the collapsible and portable seating apparatus in an operational position, in accordance with one or more embodiments of the present disclosure.

In another embodiment, as illustrated in at least FIG. 2F, the canopy 104 is removable from and/or couplable to the one or more canopy support assemblies 228. For example, the canopy 104 and the one or more canopy supports 230 may include paired components of one or more coupling or interlocking assemblies. For instance, the paired components may couple or attached together when the canopy 104 is added to the seating assembly 102 and/or may be uncoupled or detached when the canopy 104 is removed from the seating assembly 102.

It is noted herein the seating apparatus 100 may be configured such that the canopy 104 is coupled to the one or more canopy support assemblies 228 may be sloped at an angle relative to a plane defined by the seating surfaces of the seats 202, and/or the one or more canopy support assemblies 228 hold the canopy 104 at the angle. For example, the slope may be necessary to allow water or other fluid run-off from the canopy 104 should the seating apparatus 100 be used in a wet environment, to prevent or reduce damage to the canopy 104 (e.g., excess weight causing stretching, increased wear, or the like). In addition, it is noted herein the seating apparatus 100 may be configured such that the canopy 104 is non-sloped or is parallel (or substantially parallel) relative to a plane defined by the seating surfaces of the seats 202.

Figure 2G:
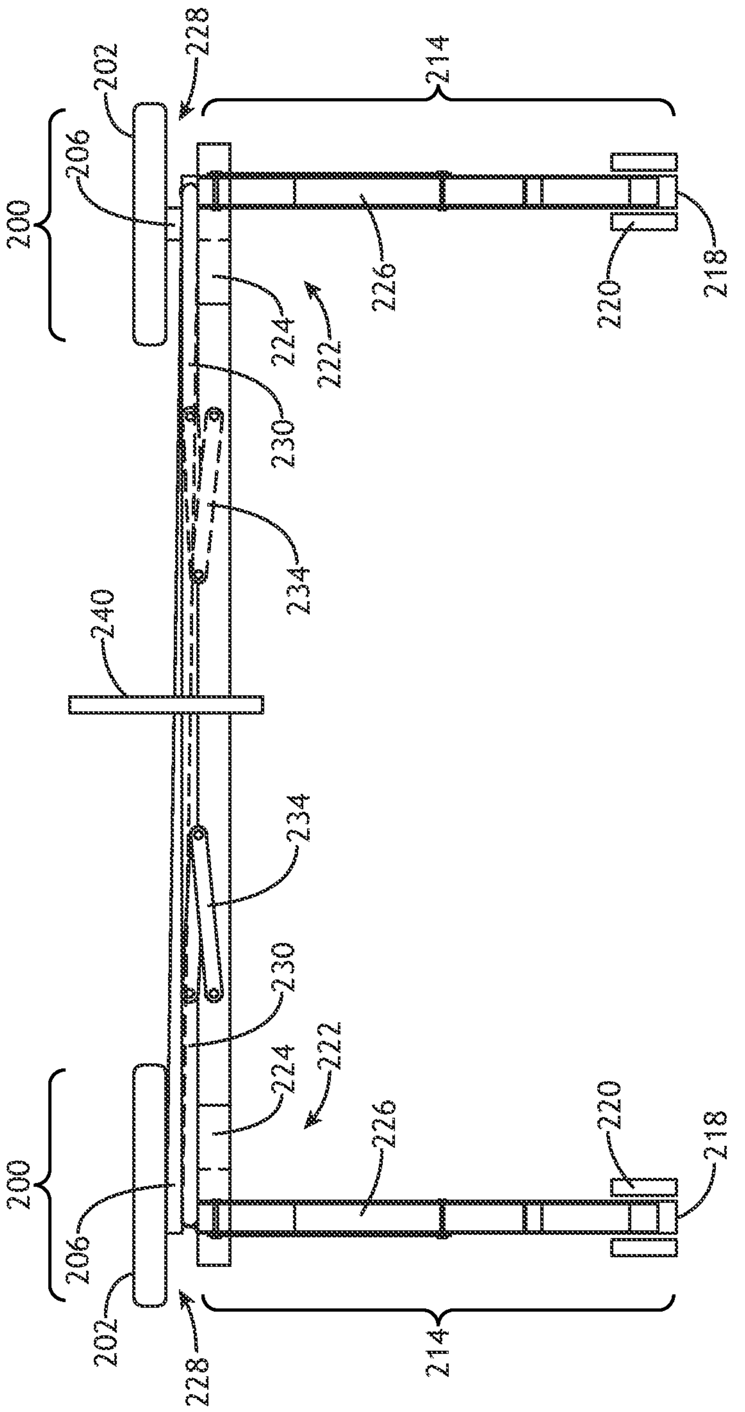
FIG. 2G illustrates a rear elevation view of a seating assembly of the collapsible and portable seating apparatus in an operational position and a canopy of the collapsible and portable seating apparatus in a stowable or transportable position, in accordance with one or more embodiments of the present disclosure.
Figure 2H:
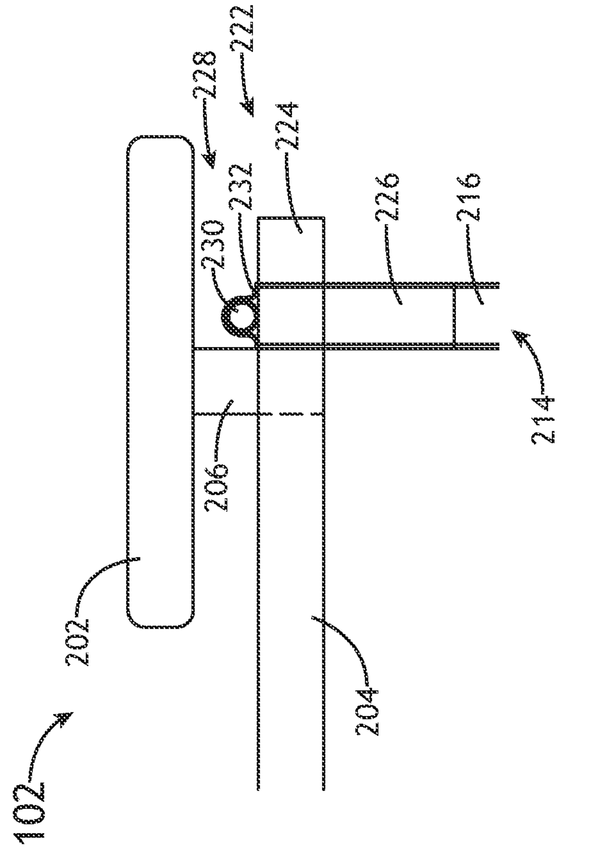
FIG. 2H illustrates a side view of portions of a seating assembly of a collapsible and portable seating apparatus, in accordance with one or more embodiments of the present disclosure.
Figure 2I:
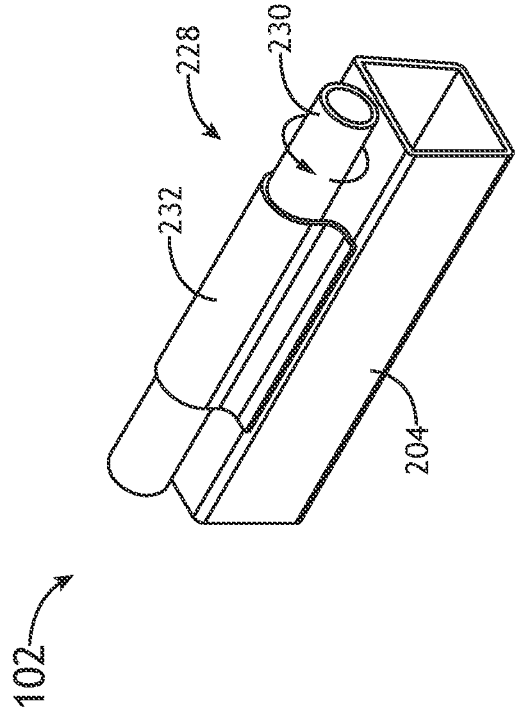
FIG. 2I illustrates a perspective view of portions of a seating assembly of a collapsible and portable seating apparatus, in accordance with one or more embodiments of the present disclosure.

It is noted herein at least FIG. 2F illustrates the one or more canopy support assemblies 228 in an operational position, while FIG. 2G illustrates the one or more canopy support assemblies 228 in the stowable or transportable position.

It is noted herein the canopy support assemblies 228 may include one or more lock assemblies to keep the canopy support assemblies 228 in an operational form and/or in a stowable or transportable form.

In another embodiment, the seating assembly 102 includes one or more ground sleeves. The one or more ground sleeves may be telescopic and configured to engage a ground surface by being inserted into the ground surface to provide increased stability and resistance against at least one applied force such as an internal force (e.g., unbalanced weight of components, or the like) or an external force (e.g., wind, a force applied by a user, or the like). For example, the one or more ground sleeves may be inserted directly in the ground surface. By way of another example, the one or more ground sleeves may be inserted indirectly into a receiver embedded in the ground surface. By way of another example, the one or more ground sleeves may be inserted indirectly into a receiver of a flange or plate set on the ground surface). The one or more ground sleeves may be inserted into other components of the seating assembly 102. For example, the components of the seating assembly 102 and the one or more ground sleeves may include holes configured to receive fasteners (e.g., fasteners including, but not limited to, screws; nuts, washers, and bolts; hitch and cotter pins; spring-loaded pistons; or the like), where the fasteners hold the one or more ground sleeves at a select height (or depth) within the components of the seating assembly 102. By way of another example, the one or more ground sleeves may be gravity-fed from the components of the seating assembly 102 (e.g., dropped to a select depth), and may be returned to a stowable or transportable position via a pin return assembly (e.g., a pin coupled to the one or more ground sleeves and slidable within a groove in the components of the seating assembly 102).

In one non-limiting example, the seating assembly 102 may include one or more ground sleeves 236 installed within the one or more legs 212 of the one or more leg assemblies 210, and configured to telescope or slide into/out of the one or more legs 212. In another non-limiting example, the seating assembly 102 may include one or more ground sleeves 238 installed within the one or more primary legs 216 of the one or more wheel assemblies 214, and configured to telescope or slide into/out of the one or more primary legs 216.

It is noted herein the one or more ground sleeves 236 and/or the one or more ground sleeves 238 may include a tip (e.g., a spike, or the like) configured to easier insertion into a ground surface and/or a receiver embedded in the ground surface or set on the ground surface. In addition, it is noted herein the one or more ground sleeves 236 and/or the one or more ground sleeves 238 may be configured for being fastened or attached to a portion of a building. For example, a mating assembly or components of a mating assembly may be installed on a wall of a building such that when in the collapsed form the seating apparatus 100 may be transported to the mating assembly and temporarily attached to the wall of the building via one or more brackets of the mating assembly. Such a mating assembly may be installed in the building during construction of the building or may be retrofitted into an already existing building.

In one embodiment, the seating apparatus 100 is usable in indoor environments. For example, the seating apparatus 100 may be used on indoor sports courts or fields. For instance, FIGS. 5A-5D illustrate the seating apparatus 100 in various positions on a basketball court, which may include the mating assembly or the components of the mating assembly configured to receive the one or more ground sleeves 236 and/or the one or more ground sleeves 238. As illustrated in FIGS. 5A-5D, the seating apparatus 100 may be in a stowable or transportable form on the sideline of a basketball court during gameplay, transported onto the court in the stowable or transportable form during a time-out period, and set up in an operational form for use by the coach and players during the time-out period (e.g., either without or with the canopy 104). By way of another example, the apparatus 100 may be usable in a cafeteria, a gymnasium, a lecture hall, a convention center, a field, indoor stadium, an ice rink, or any indoor location implementing movable and/or removable seating.

In another embodiment, the seating apparatus 100 is usable in outdoor environments. For example, the seating apparatus 100 may be used on an on an outdoor field, at an outdoor stadium, on a driveway, on a patio, in a backyard, or other outdoor area. For instance, outdoors gatherings may center around the viewing of a sports event or presentation on a display (e.g., a television or a screen). In this instance, the seating apparatus 100 may be implemented instead of taking down, setting up, dismantling, and/or re-arranging any indoor chairs, benches, tables, televisions, projector screens, and other necessary components. It is noted herein the collapsibility and portability of the apparatus 100 may provide a greater amount of ease in protecting any weather-sensitive components from being damaged should the weather change abruptly and/or without notice. By way of another example, the seating apparatus 100 may be usable on an outdoor sports field (e.g., football field, soccer field, baseball field, lacrosse field, ice rink, or the like), at a park, in a common green space, or any outdoor location implementing movable and/or removable seating.

In another embodiment, the seating assembly 102 includes one or more media mast members 240. For example, the one or more media mast members 240 may be coupled to the frame 204. For instance, a first set 200 with a first seat 202 may be coupled to a first section of the frame 204, at least a second set 200 including at least a second seat 202 may be coupled to a second section of the frame 204, the media mast member 240 may be coupled to a third section of the frame 204, and the third section of the frame 204 couples the first second of the frame 204 and the second section of the frame 204.

In another embodiment, the media mast 106 is removable from and/or couplable to the one or more media mast members 240 when in the stowable or transportable position or the operational position.

Figure 3A:
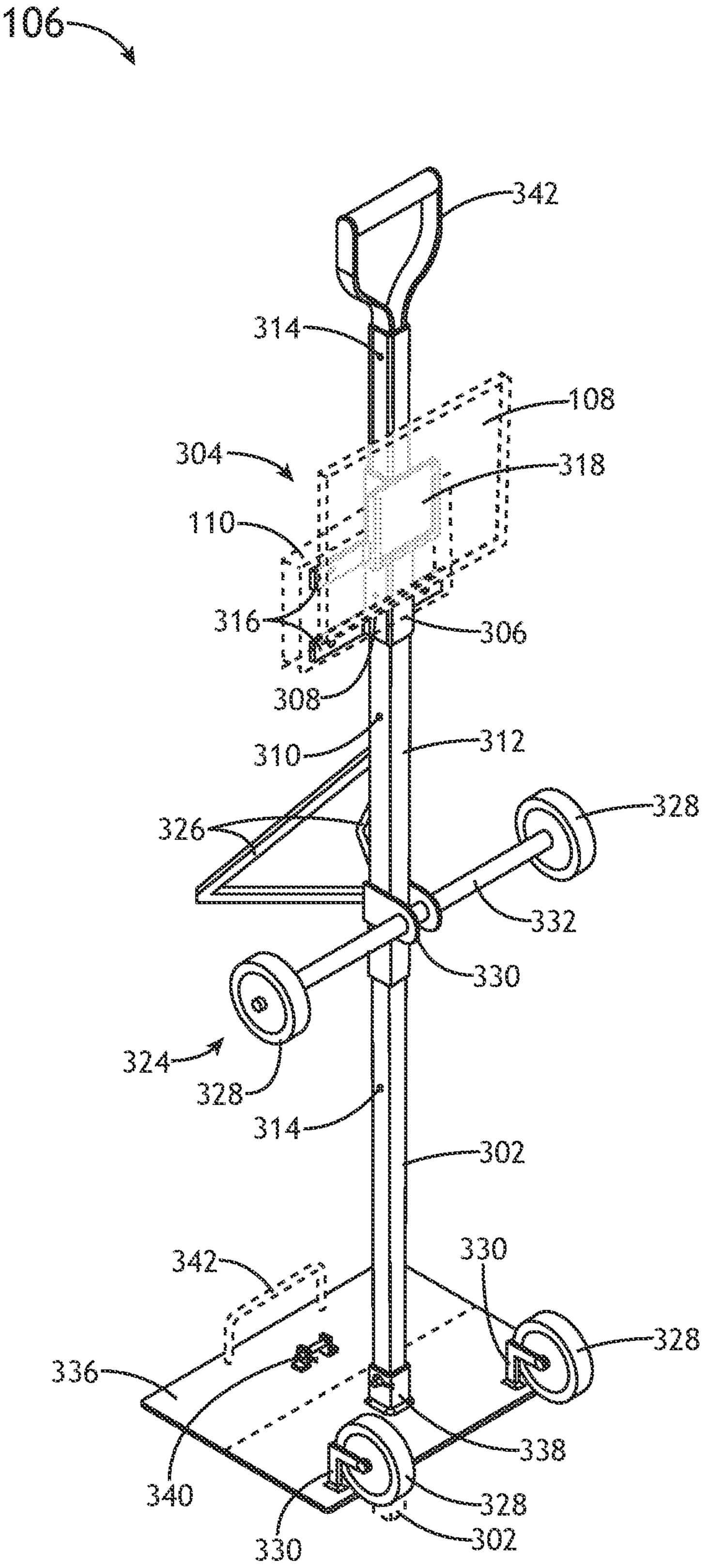
FIG. 3A illustrates a perspective view of a media mast of a collapsible and portable seating apparatus, in accordance with one or more embodiments of the present disclosure.
Figure 3B:
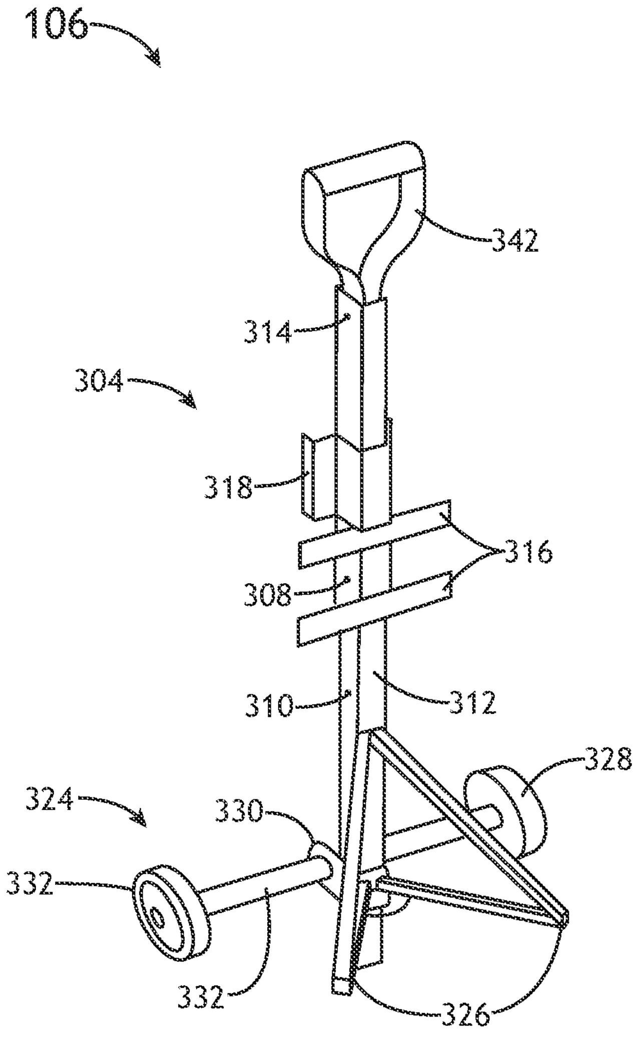
FIG. 3B illustrates a perspective view of a media mast of a collapsible and portable seating apparatus, in accordance with one or more embodiments of the present disclosure.
Figure 3C:
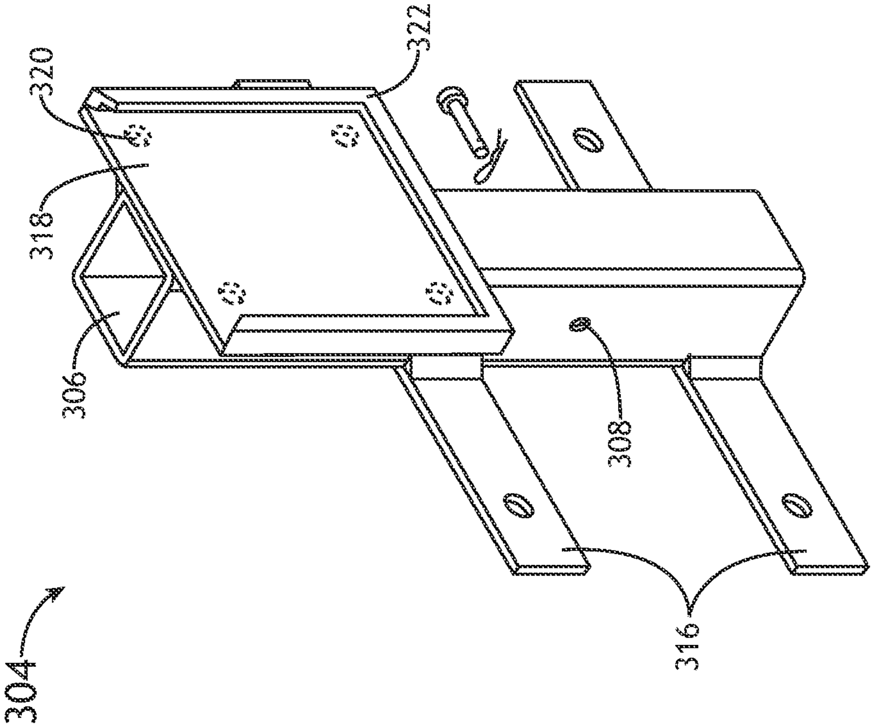
FIG. 3C illustrates a perspective view of portions of a media mast of a collapsible and portable seating apparatus, in accordance with one or more embodiments of the present disclosure.
Figure 3D:
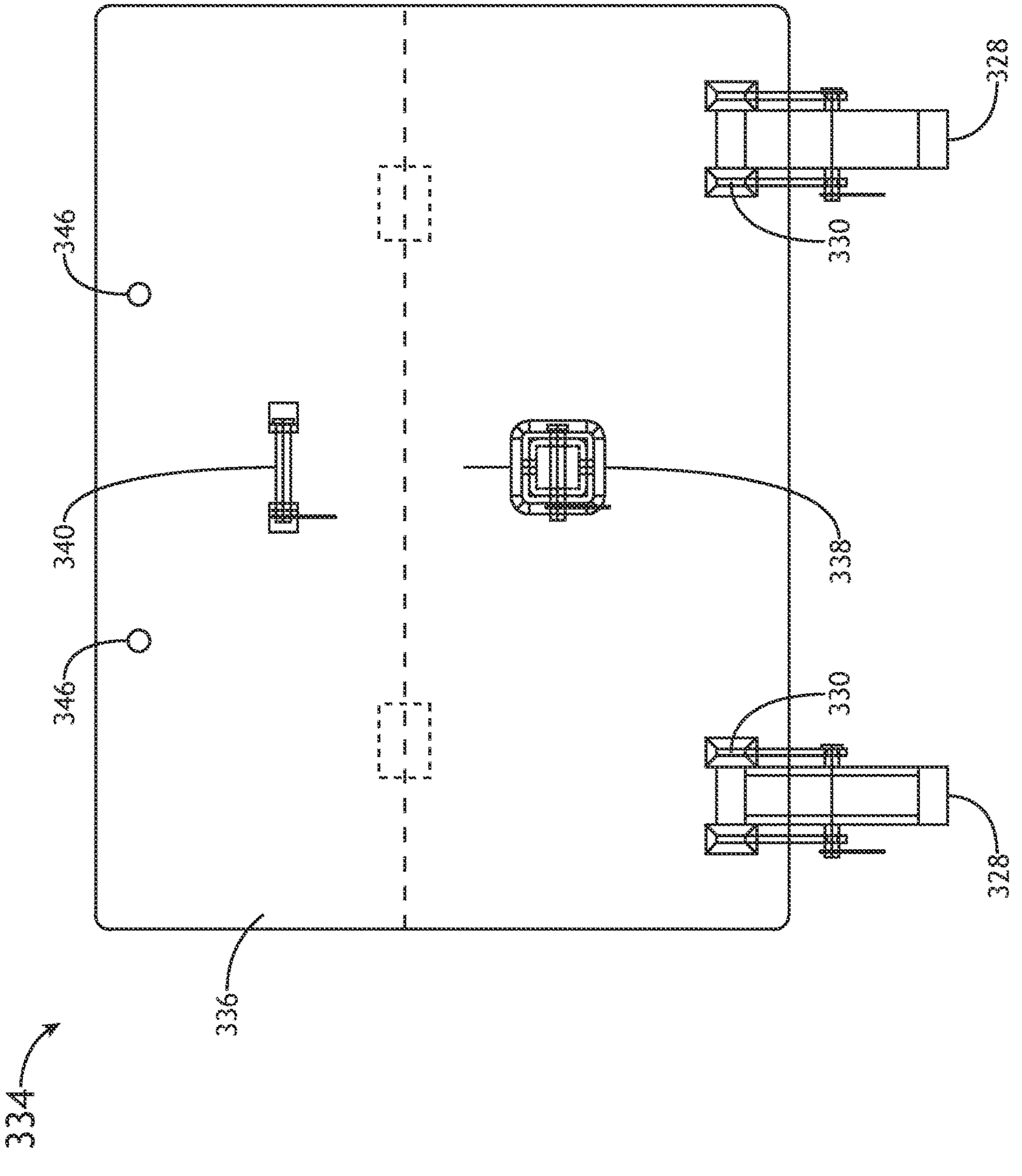
FIG. 3D illustrates a top plan view of portions of a media mast of a collapsible and portable seating apparatus, in accordance with one or more embodiments of the present disclosure.
Figure 3E:
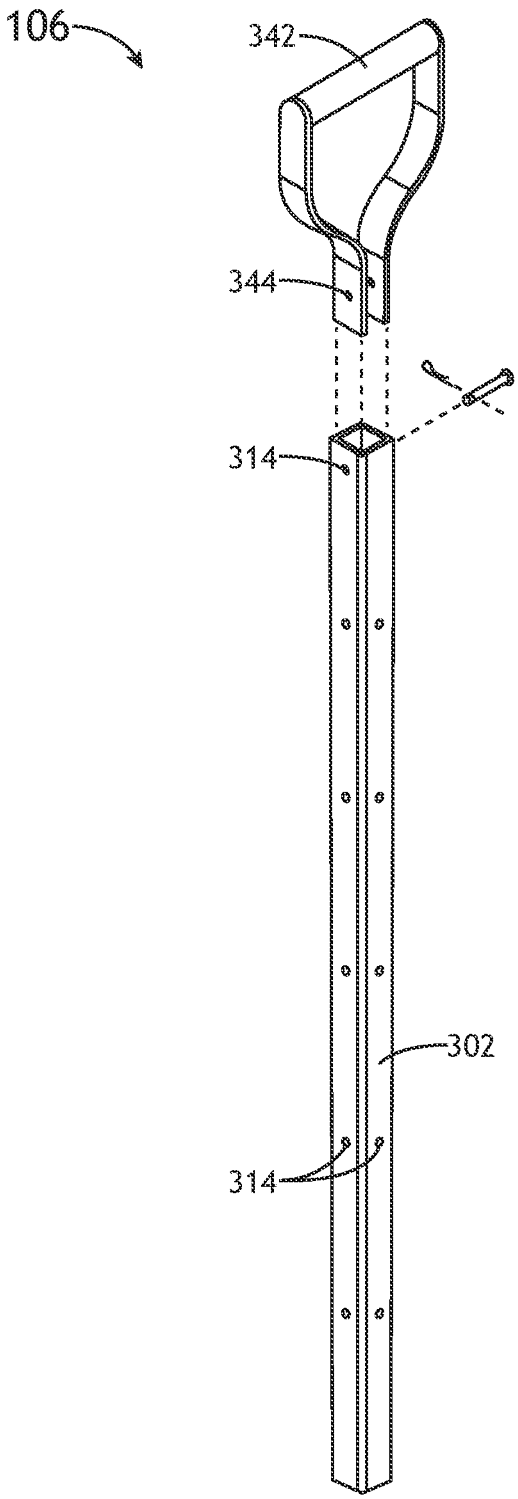
FIG. 3E illustrates a perspective view of portions of a media mast of a collapsible and portable seating apparatus, in accordance with one or more embodiments of the present disclosure.
Figure 4A:
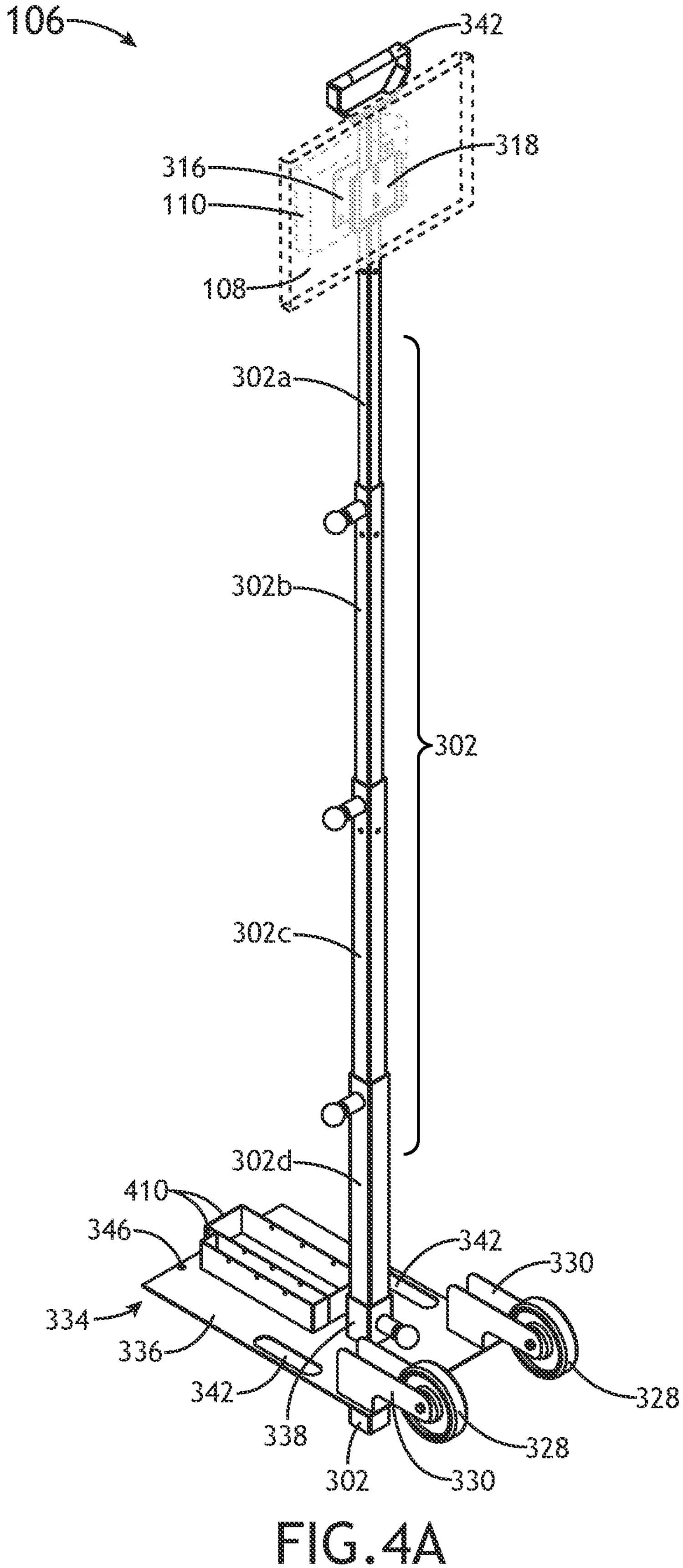
FIG. 4A illustrates a perspective view of a media mast of a collapsible and portable seating apparatus, in accordance with one or more embodiments of the present disclosure.
Figure 4B:
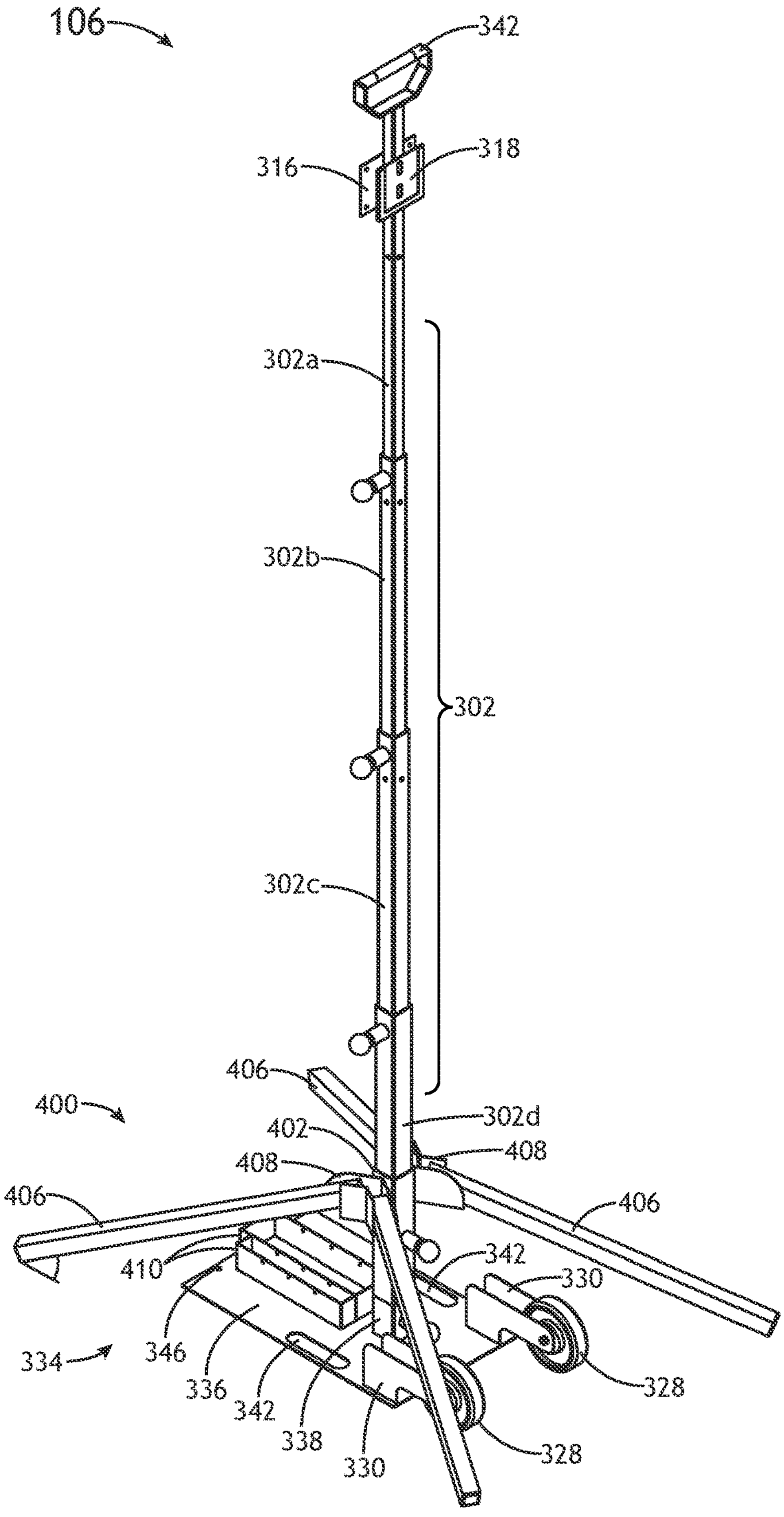
FIG. 4B illustrates a perspective view of a media mast of a collapsible and portable seating apparatus in an operational position, in accordance with one or more embodiments of the present disclosure.
Figure 4C:
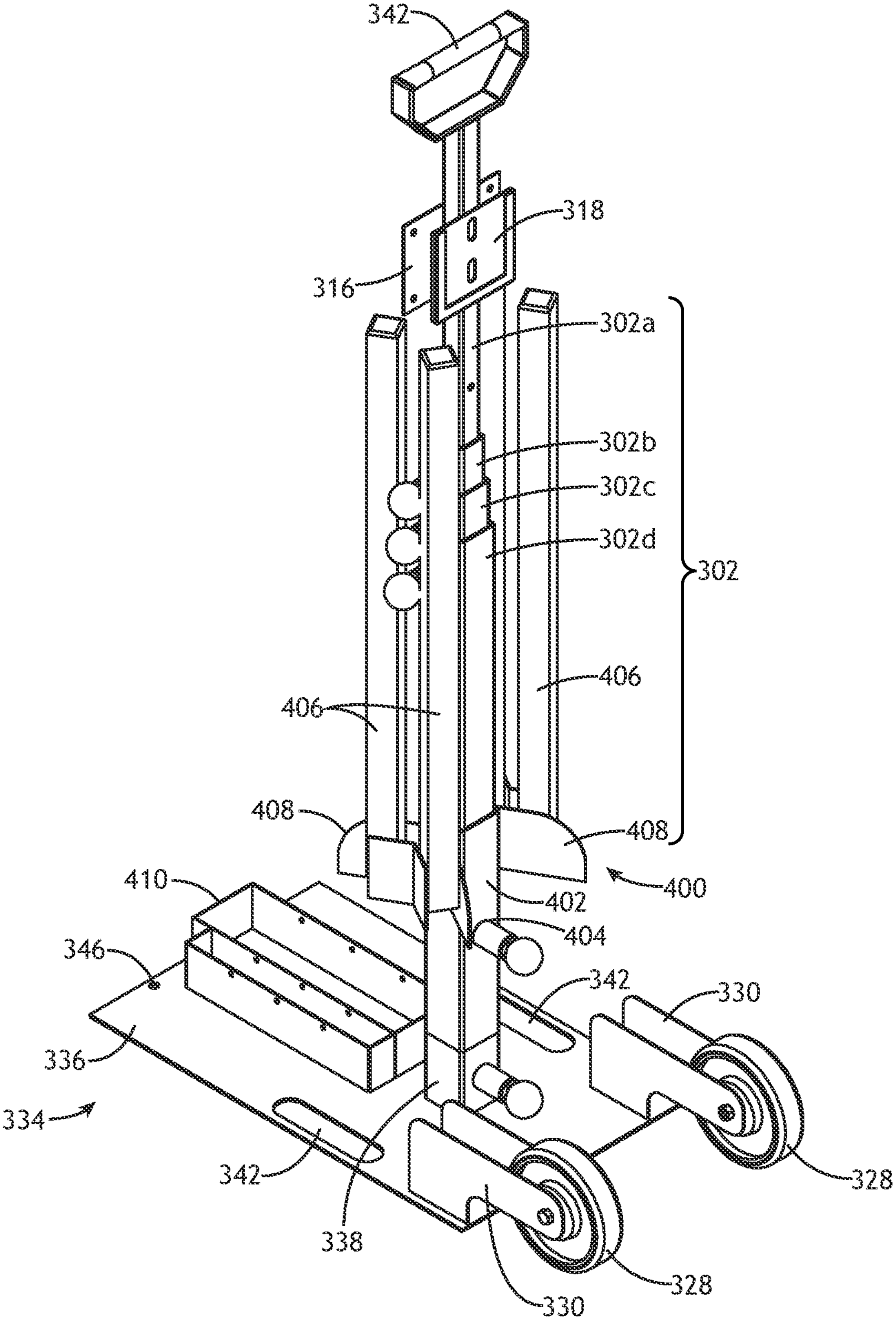
FIG. 4C illustrates a perspective view of a media mast of a collapsible and portable seating apparatus in a stowable or transportable position, in accordance with one or more embodiments of the present disclosure.
Figure 4D:
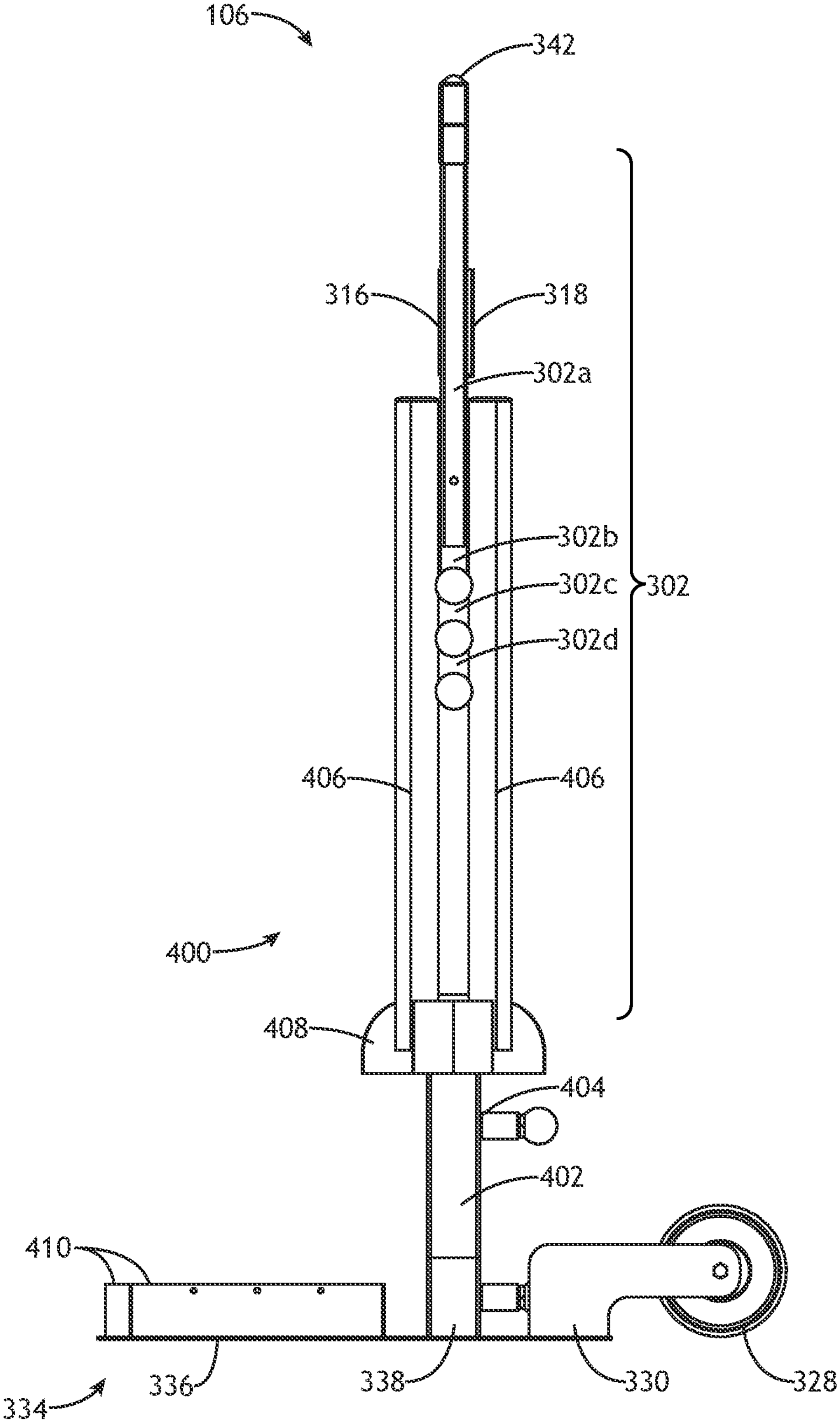
FIG. 4D illustrates a side view of a media mast of a collapsible and portable seating apparatus in a stowable or transportable position, in accordance with one or more embodiments of the present disclosure.
Figure 4E:
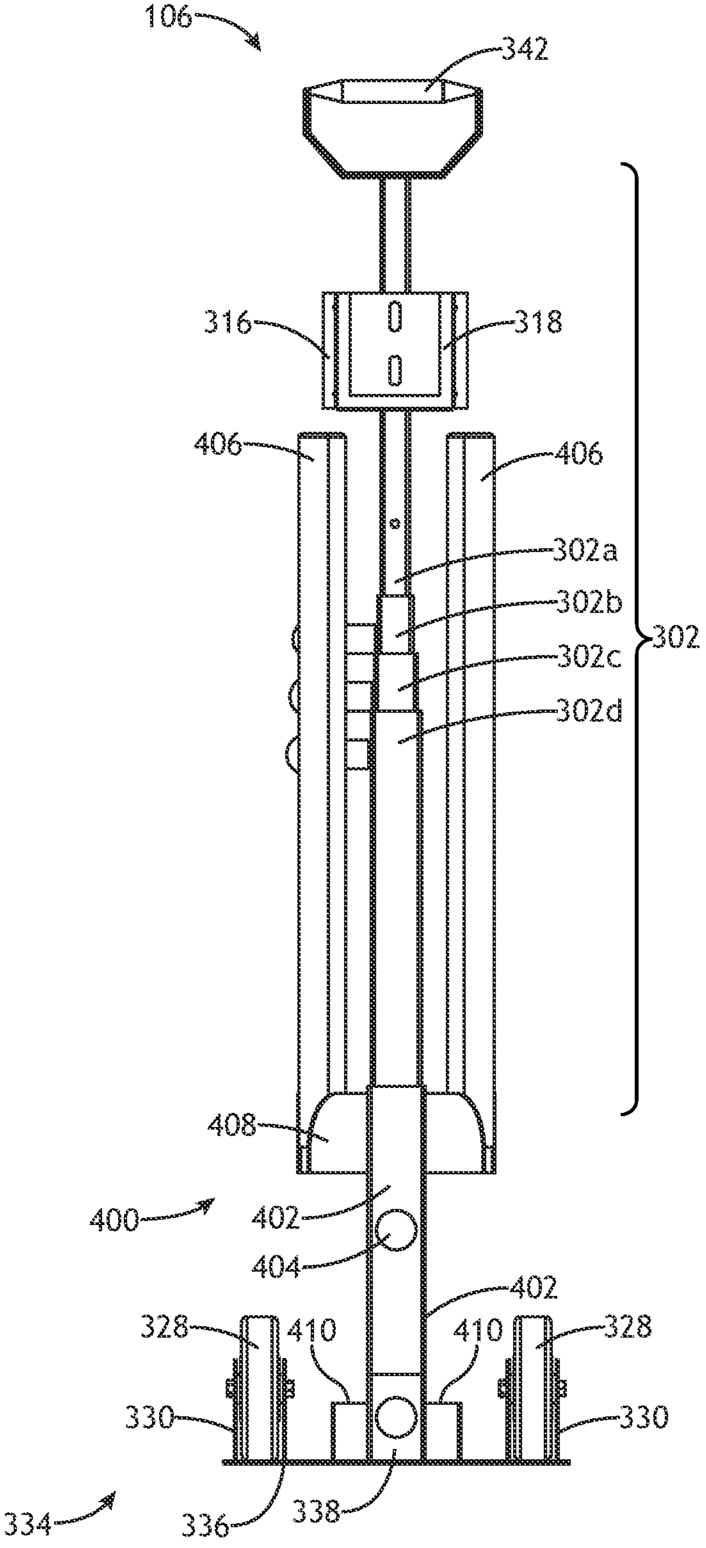
FIG. 4E illustrates a rear view of a media mast of a collapsible and portable seating apparatus in a stowable or transportable position, in accordance with one or more embodiments of the present disclosure.
Figure 4F:
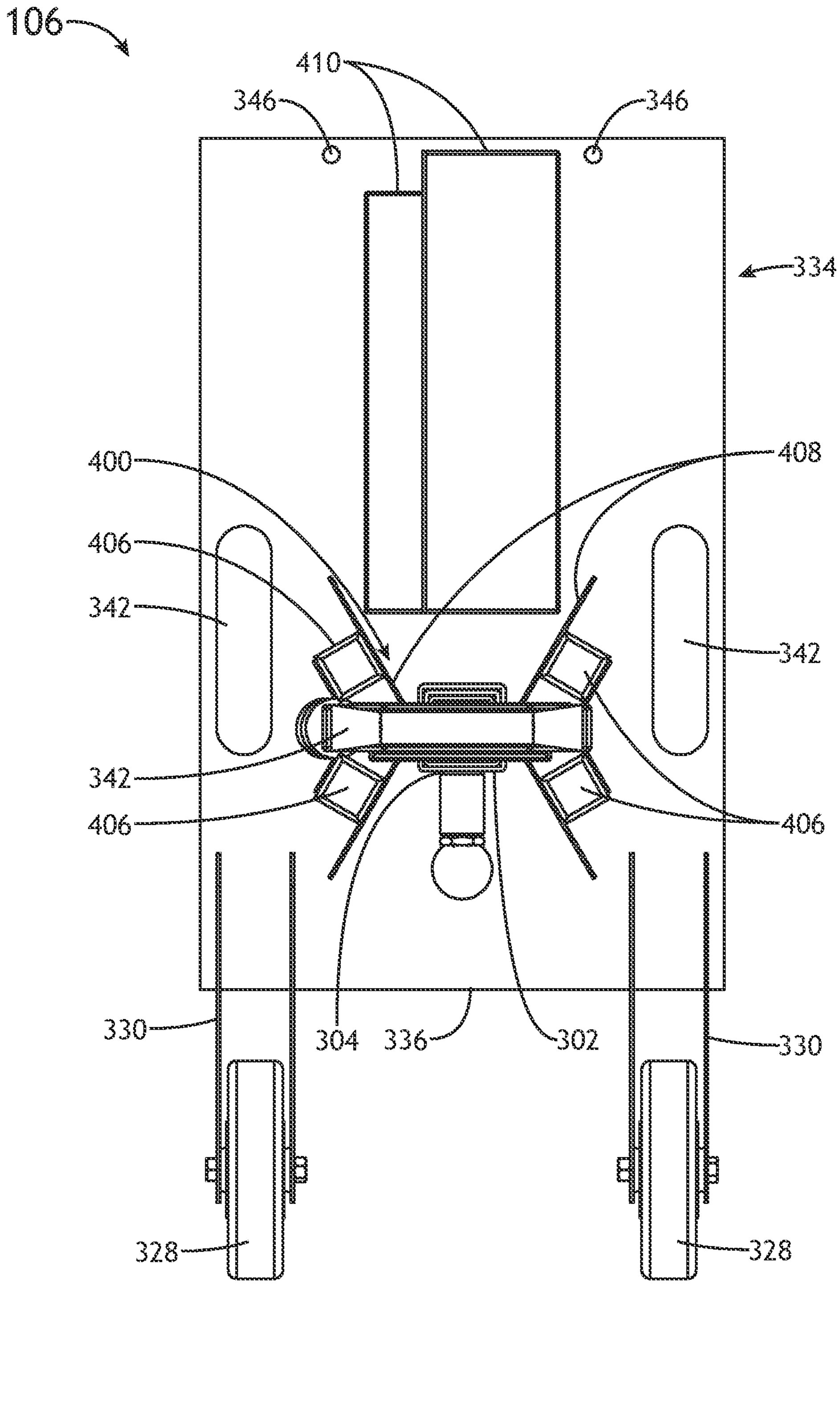
FIG. 4F illustrates a top plan view of a media mast of a collapsible and portable seating apparatus in a stowable or transportable position, in accordance with one or more embodiments of the present disclosure.
Figure 5A:
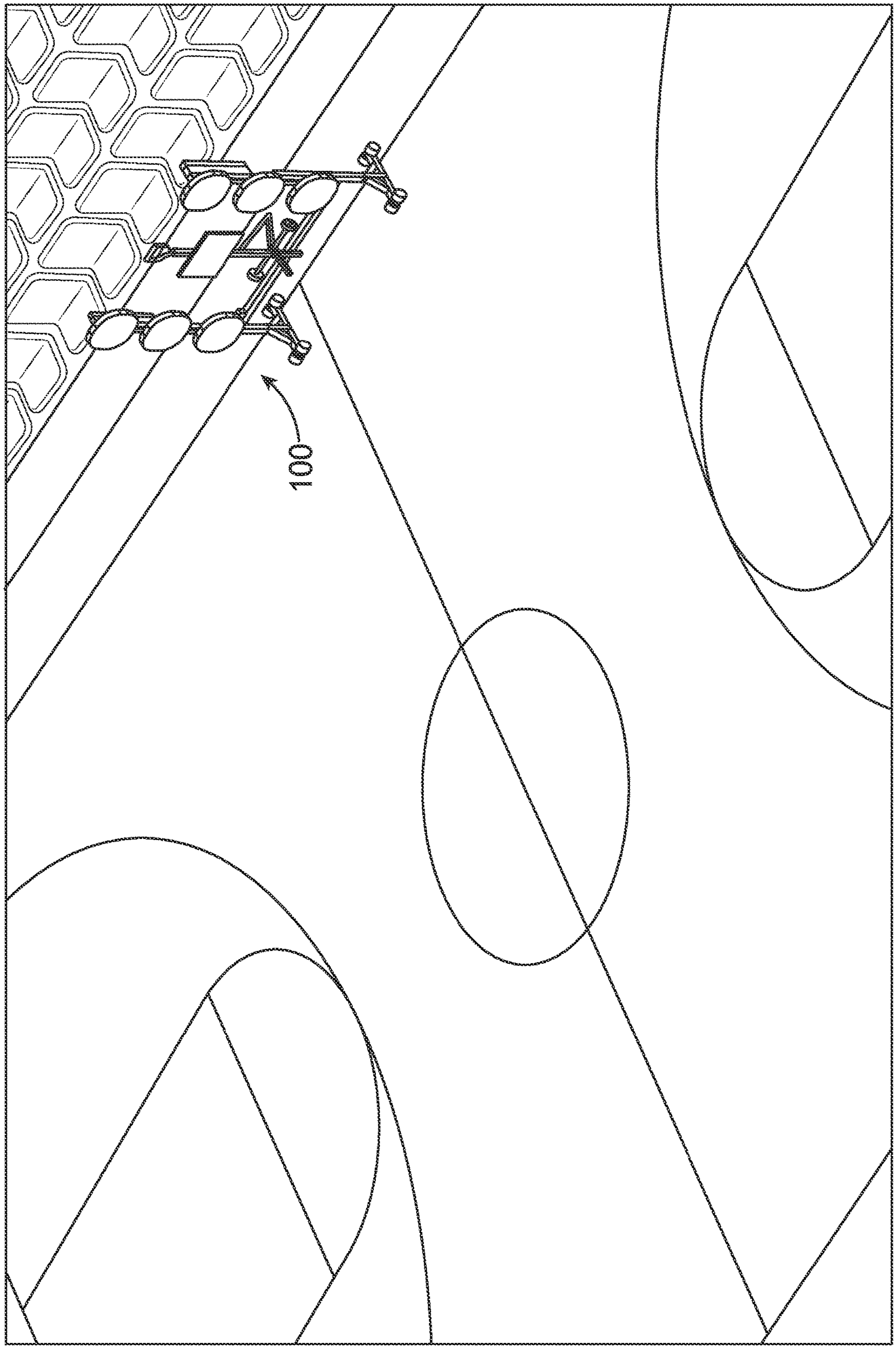
FIG. 5A illustrates a collapsible and portable seating apparatus located on a sideline of a basketball court in a stowable or transportable position, in accordance with one or more embodiments of the present disclosure.
Figure 5B:
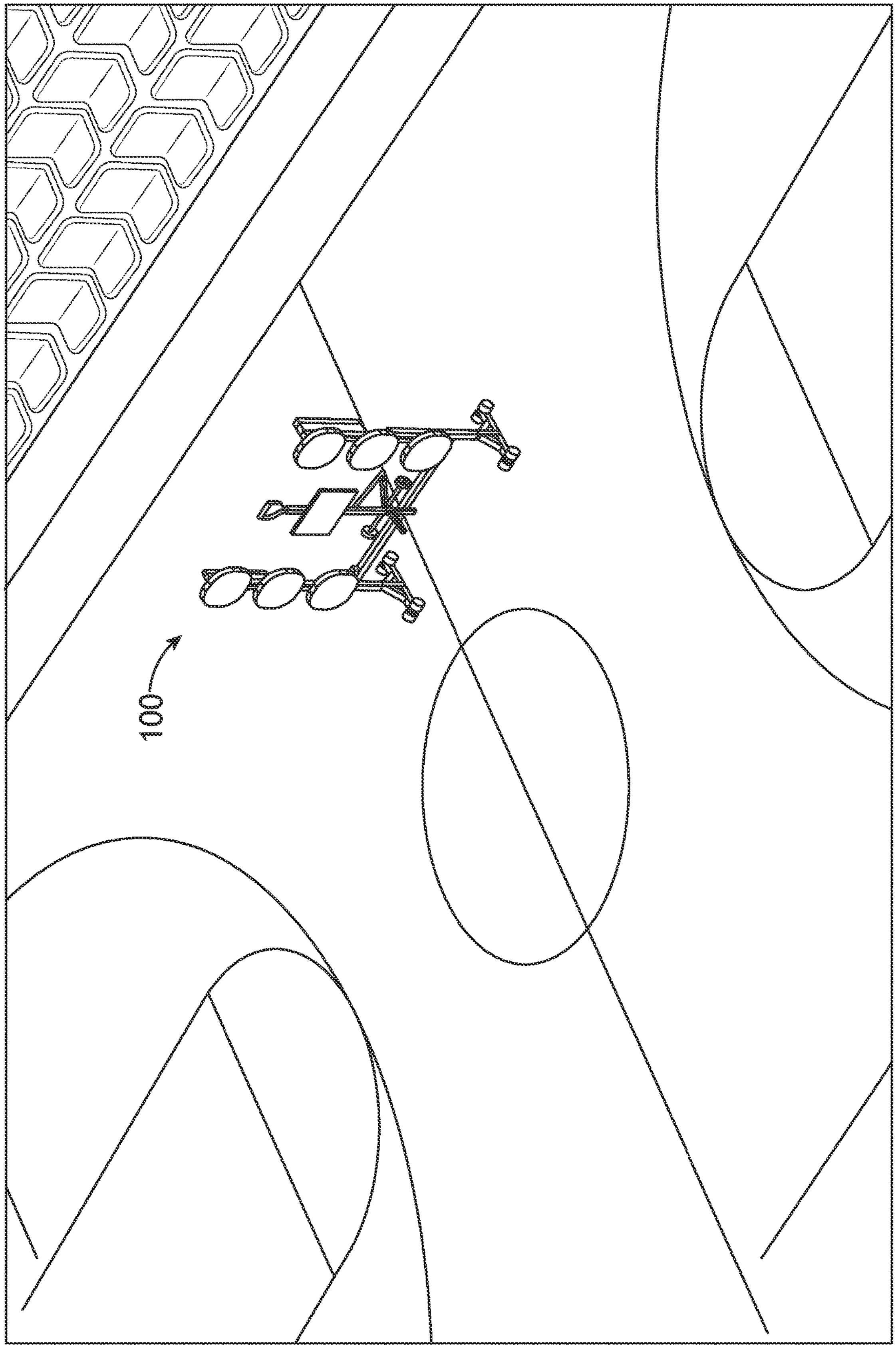
FIG. 5B illustrates a collapsible and portable seating apparatus located on a basketball court in a stowable or transportable position, in accordance with one or more embodiments of the present disclosure.
Figure 5C:
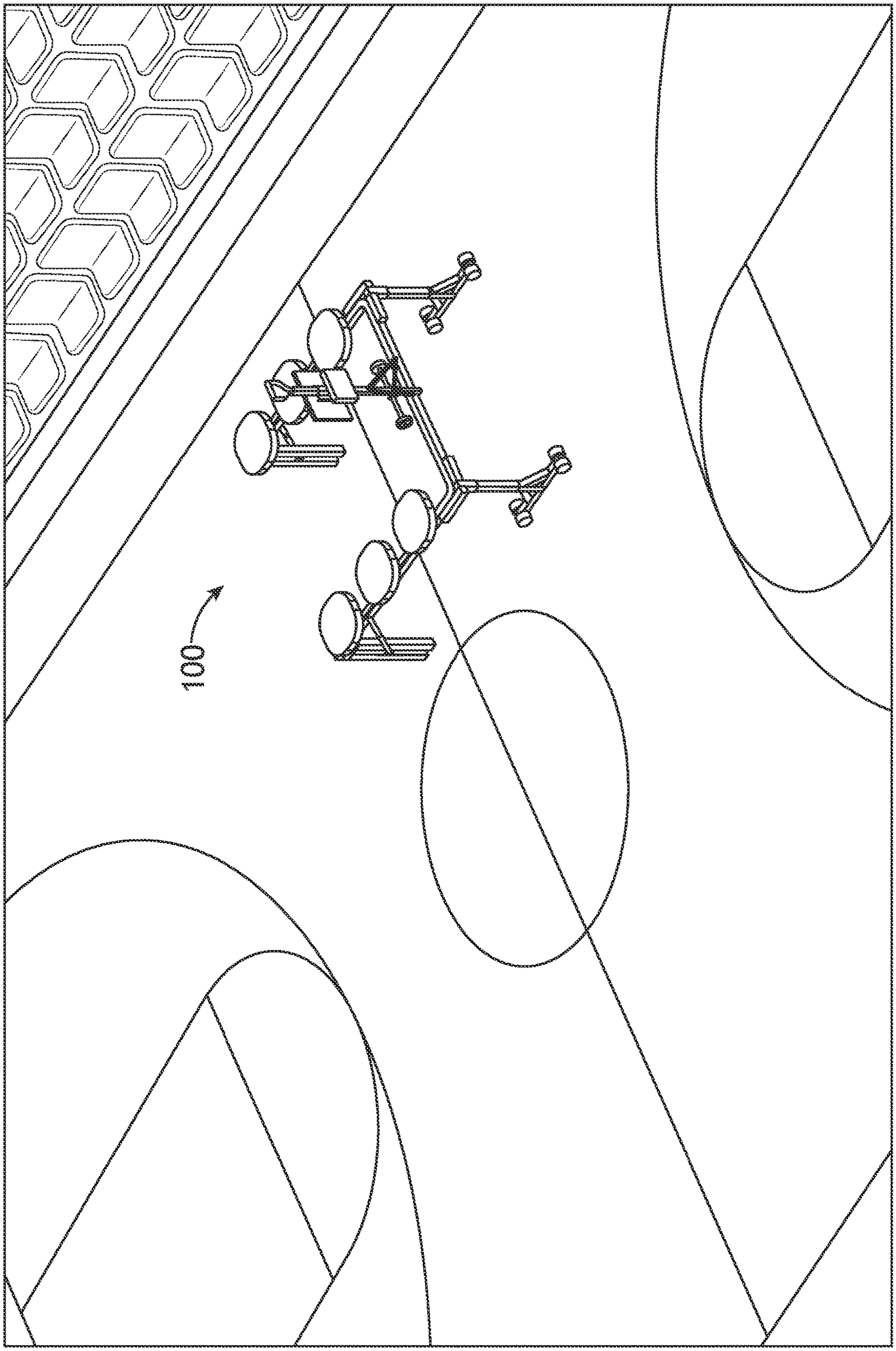
FIG. 5C illustrates a collapsible and portable seating apparatus located on a basketball court in an operational position, in accordance with one or more embodiments of the present disclosure.
Figure 5D:
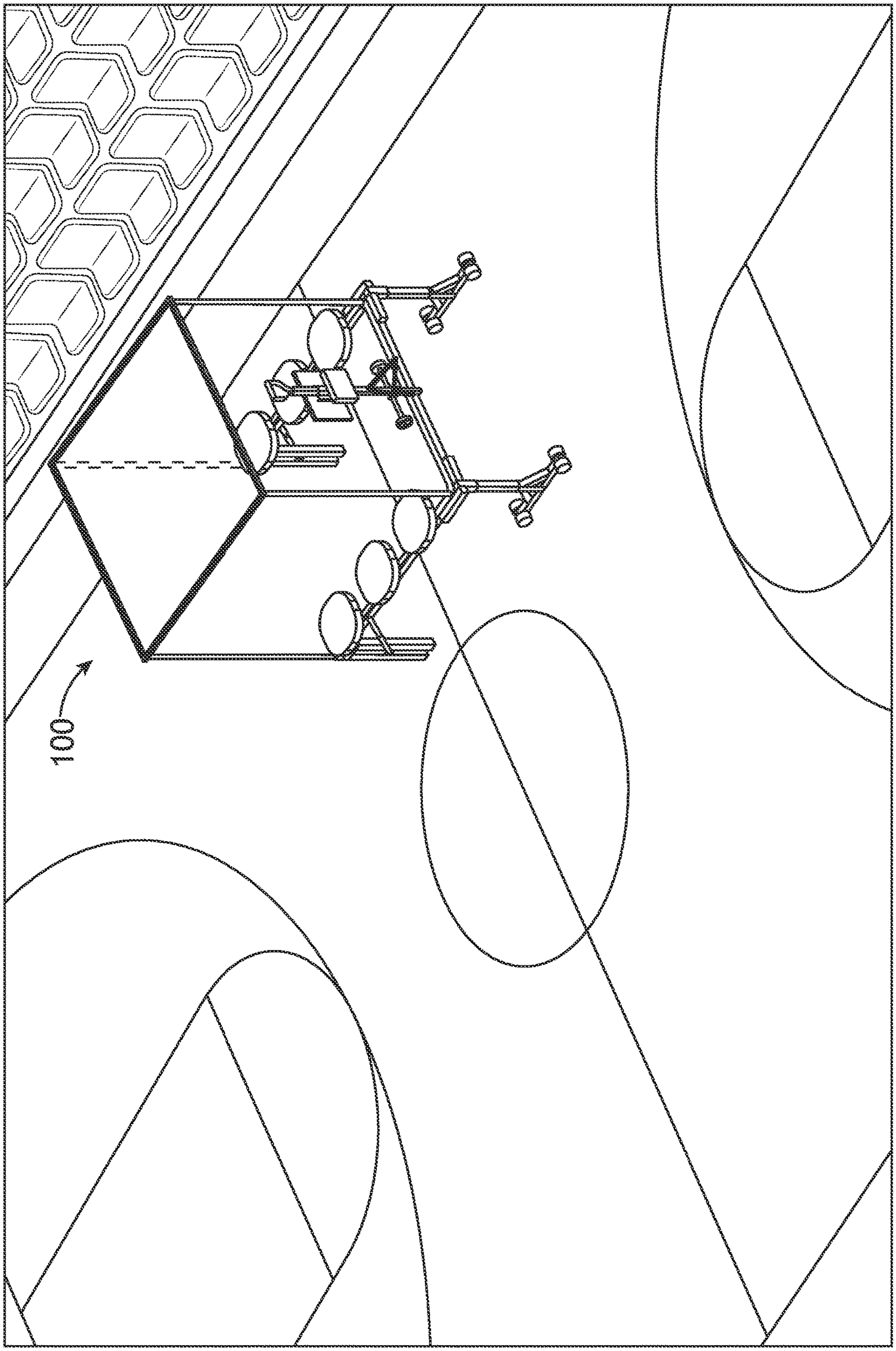
FIG. 5D illustrates a collapsible and portable seating apparatus located on a basketball court in an operational position, in accordance with one or more embodiments of the present disclosure.

FIGS. 3A-4F in general illustrate example embodiments of the media mast 106, in accordance with one or more embodiments of the present disclosure. It is noted herein the one or more image generation devices 108 and the electrical components or connections 110 have been removed from FIGS. 3B-3D and FIGS. 4B-4F for clarity, but should be understood as being similarly couplable to the media mast 106 as illustrated in FIGS. 3B-3D and FIGS. 4B-4F as illustrated in FIGS. 3A and 4A, respectively.

In one embodiment, the media mast 106 includes a tower 302. For example, the tower 302 may include a single tower section. By way of another example, the tower 302 may include multiple tower sections. For instance, the multiple tower sections may be telescopic. In addition, the multiple tower sections may be couplable together. In general, the tower 302 may include 1, 2, . . . up to an N number of tower sections. In one non-limiting example, the tower 302 may include tower sections 302*a*, 302*b*, 302*c*, 302*d*. In this non-limiting example, each of the tower sections 302*a*, 302*b*, 302*c*, 302*d* may include holes configured to receive fasteners (e.g., fasteners including, but not limited to, screws; nuts, washers, and bolts; hitch and cotter pins; spring-loaded pistons; or the like) to hold the tower sections 302*a*, 302*b*, 302*c*, 302*d* in place when the tower 302 is extended or collapsed.

In another embodiment, the media mast 106 includes a media bracket assembly 304 coupled to the tower 302. The media bracket assembly 304 may include a main bracket shaft 306 coupled to the tower 302.

For example, the main bracket shaft 306 may couple to the tower 302 or a telescopic tower section of the tower 302. For instance, the media bracket assembly 304 may include one or more holes 308 which align with one or more holes 310 in a main support shaft 312 and/or may align with one or more holes 314 in the tower 302, where the one or more holes 308, 310, 314 may be configured to receive fasteners including, but not limited to, screws; nuts, washers, and bolts; hitch and cotter pins; spring-loaded pistons; or the like.

By way of another example, the main bracket shaft 306 may fit over the tower 302 or a telescopic tower section of the tower 302. For instance, at least a portion of the tower section 302*d* may be inserted directly in the ground surface and held in place within the flange or receiver 338 with the fasteners, where the fasteners hold the at least a portion of the tower section 302*d* at a select height (or depth) within the flange or receiver 338. In addition, at least a portion of the tower section 302*d* may be inserted indirectly into a receiver embedded in the ground surface. Further, at least a portion of the tower section 302*d* may be inserted indirectly into a receiver of a flange or plate set on the ground surface). It is noted herein the at least a portion of the tower section 302*d* may be gravity-fed from the flange or receiver 338 (e.g., dropped to a select depth), and may be returned to a stowable or transportable position via a pin return assembly (e.g., a pin coupled to the one or more ground sleeves and slidable within a groove in the components of the flange or receiver 338).

By way of another example, the main bracket shaft 306 may fit within the tower 302. By way of another example, the main bracket shaft 306 may be a telescopic tower section of the tower 302.

The media bracket assembly 304 may include one or more electronics brackets 316 coupled to the main bracket shaft 306. For example, the one or more electrical components or connections 110 configured to provide power to the seating apparatus 100 may be coupled to one or more electronics brackets 316. For instance, where the media mast 106 (and the seating apparatus 100) may be configured to operate on battery power via battery packs, the battery packs may be configured to couple to the one or more electronics brackets 316.

It is noted herein, however, the seating assembly 102 may include one or more electrical components or connections (e.g., the battery packs), and the seating assembly 102 and the media mast 106 may be physically coupled and electrically or communicatively coupled together to transmit data and/or power between the seating assembly 102 and the media mast 106.

The media bracket assembly 304 may include one or more device mounts 318. For example, the one or more device mounts 318 may be configured to hold the one or more image generation devices 108. For instance, the one or more device mounts 318 may include one or more holes or studs 320, and the one or more image generation devices 108 may be configured to couple to the one or more device mounts 318 via one or more fasteners (e.g., screws; nuts, washers, and bolts; hitch and cotter pins; spring-loaded pistons; or the like), an adhesive, or the like. In addition, the one or more device mounts 318 may include one or more channels or grooves 322, and the one or more image generation devices 108 or the one or more projectors may include one or more protrusions (or be coupled to plates with one or more protrusions) corresponding to the one or more channels or grooves 322. It is noted herein the one or more device mounts 318 may include the one or more holes or studs 320 in addition to or instead of the one or more channels or grooves 322. It is noted herein the media bracket assembly 304 may include a cap or bracket configured to engage with the one or more device mounts 318 (e.g., via a slide-on assembly, an interlocking assembly, friction or interference fit, fasteners, an adhesive, or the like) to keep the one or more image generation device 108 coupled to the one or more device mounts 318 (e.g., remain seated within the one or more channels or grooves 322, or the like). In addition, it is noted herein a plate with corresponding protrusions or tabs may be coupled to the one or more image generation devices 108 where the one or more channels or grooves 322 are implemented.

It is noted herein the one or more ground sleeves 236, the one or more ground sleeves 238, and/or the at least a section of the tower 302 (e.g., at least a portion of the tower section 302*d*) may be employed separately or simultaneously to provide increased stability and resistance against at least one applied force such as an internal force (e.g., unbalanced weight of components, or the like) or an external force (e.g., wind, a force applied by a user, or the like).

In another embodiment, the media mast 106 includes one or more transportation and/or support assemblies.

In one non-limiting example, as illustrated in at least FIGS. 1A, 1B, and 3A-3D, the media mast 106 may include a transportation and support assembly 324. The transportation and support assembly 324 may include the main support shaft 312. The transportation and support assembly 324 may include one or more support frames 326 coupled to the main support shaft 312. The one or more support frames 326 may include members set at an angle relative to one another, ranging from 0 degrees to 90 degrees. For instance, the multiple members may be set at a 45-degree angle. Where there are multiple support frames 326, the multiple support frames 326 may be set at a select angle relative to one another, ranging from 0 degrees to 180 degrees. For instance, the multiple support frames 326 may be set at 90 degrees. The one or more support frames 326 may be coupled to a face of the main support shaft 312 facing a different direction (e.g., facing opposite) as a direction of a face of the media bracket assembly 304 to which the one or more device mounts 318 are coupled. The one or more support frames 326 may be coupled to a face of the main support shaft 312 facing a same direction as a direction of a face of the media bracket assembly 304 to which the one or more electronics brackets 316 are coupled. In this regard, the one or more support frames 326 may provide support when the media mast 106 is tilted back to allow for viewing of a display coupled to the one or more device mounts 318, where the media mast 106 is set on a ground surface, while relying on an additional downward force provided by power, circuitry, or other electrical connections which may be coupled directly or indirectly to the one or more electronics brackets 316 over the one or more support frames 326 for additional stability.

The transportation and support assembly 324 may include one or more wheels 328 coupled to one or more brackets 330, where the one or more brackets 330 are coupled to the main support shaft 312. For example, the one or more wheels 328 may be directly coupled to the one or more brackets 330. By way of another example, the one or more brackets 330 may be coupled to the one or more brackets 330 via one or more axles 332, where the one or more axles 332 couple to or pass through the one or more brackets 330. It is noted herein the one or more wheels 328 may be fixed in place by the one or more brackets 330 and/or axles 332, or may be retractable when the media mast 106 is coupled to the media mast member 240.

The one or more wheels 328 may be positioned on a different side (e.g., an opposite side) of the main support shaft 312 compared to a side of the media bracket assembly 304 to which the one or more support frames 326 are coupled. In this regard, the one or more wheels 328 may be used to transport the media mast 106 without concern of the one or more support frames 326 interfering with motion where the media mast is rolled on a ground surface, as the one or more support frames 326 are held up in the air when the media mast 106 is tipped.

In another non-limiting example, as illustrated in at least FIGS. 1A, 1B, and 3A-3D, the media mast 106 may include a transportation and support assembly 334. The transportation and support assembly 334 may be instead addition to the transportation and support assembly 324 (e.g., be positioned below the transportation and support assembly 324 on the tower 302), or may be instead of the transportation and support assembly 324.

The transportation and support assembly 334 may include a baseplate 336. For example, the baseplate 336 may be a single piece of material (e.g., a single solid piece, piece with patterned cuts or voids, piece with unpatterned cuts or voids, or the like). By way of another example, the baseplate 336 may include multiple pieces which are coupled together via a hinge assembly, interlocking assembly, fasteners, or the like. In this regard, the baseplate 336 may be folded when not in use for easier storage, and may be unfolded to come into contact with a ground surface when in use to provide increased stability and resistance against at least one applied force such as an internal force (e.g., unbalanced weight of components, or the like) or an external force (e.g., wind, a force applied by a user, or the like).

The transportation and support assembly 334 may include one or more wheels 328 coupled to one or more brackets 330, where the one or more brackets 330 are coupled to the baseplate 336. For example, the one or more wheels 328 may be directly coupled to the one or more brackets 330. By way of another example, the one or more brackets 330 may be coupled to the one or more brackets 330 via one or more axles, where the one or more axles couple to or pass through the one or more brackets 330. It is noted herein the one or more wheels 328 may be fixed in place by the one or more brackets 330 and/or axles, or may be retractable when the media mast 106 is coupled to the media mast member 240.

The transportation and support assembly 334 may include a flange or receiver 338 coupled to the baseplate 336. For example, the tower 302 or the main support shaft 312 may be configured to couple to the flange or receiver 338 via one or more fasteners (e.g., screws; nuts, washers, and bolts; hitch and cotter pins; spring-loaded pistons; or the like), an adhesive, or the like.

It is noted herein the flange or receiver 338 and the baseplate 336 may include aligned holes, such that at least a portion of the tower 302 may pass through the flange or receiver 338 and the baseplate 336 and configured to engage a ground surface by being inserted into the ground surface to provide increased stability and resistance against at least one applied force such as an internal force (e.g., unbalanced weight of components, or the like) or an external force (e.g., wind, a force applied by a user, or the like). For example, at least a portion of the tower section **302*d* may be inserted directly in the ground surface and held in place within the flange or receiver 338 with the fasteners. By way of another example, at least a portion of the tower section 302*d* may be inserted indirectly into a receiver embedded in the ground surface. By way of another example, at least a portion of the tower section 302*d*** may be inserted indirectly into a receiver of a flange or plate set on the ground surface).

It is noted herein the at least a portion of the tower 302 may include a tip (e.g., a spike, or the like) configured to easier insertion into a ground surface and/or a receiver embedded in the ground surface or set on the ground surface. In addition, it is noted herein the at least a portion of the tower 302 may be configured for being fastened or attached to a portion of a building. For example, a mating assembly or components of a mating assembly may be installed on a wall of a building such that when in the collapsed form the seating apparatus 100 may be transported to the mating assembly and temporarily attached to the wall of the building via one or more brackets of the mating assembly. Such a mating assembly may be installed in the building during construction of the building or may be retrofitted into an already existing building.

The transportation and support assembly 334 may include one or more hanging brackets 340. For example, a display coupled to the one or more device mounts 318 may be configured to couple to the one or more hanging brackets 340 (e.g., via linkages, straps, or the like). In this regard, being coupled to the one or more hanging brackets 340 may allow the display to remain on the one or more device mounts 318 (e.g., seated within the one or more channels or grooves 322) to provide increased stability and resistance against at least one applied force such as an internal force (e.g., unbalanced weight of components, or the like) or an external force (e.g., wind, a force applied by a user, or the like) without the need for fasteners, an adhesive, or the like. In addition, being coupled to the one or more hanging brackets 340 may allow the display to remain on the one or more device mounts 318 (e.g., seated within the one or more channels or grooves 322) to provide increased stability and resistance against at least one applied force such as an internal force (e.g., unbalanced weight of components, or the like) or an external force (e.g., wind, a force applied by a user, or the like) without the need for a cap or bracket configured to engage with the one or more device mounts 318 (e.g., via a slide-on assembly, an interlocking assembly, friction or interference fit, fasteners, an adhesive, or the like).

In another non-limiting example, as illustrated in at least FIGS. 1C, 1D, and 4A-4F, the media mast 106 may include a support assembly 400. The support assembly 400 may in addition to the transportation and support assembly 324 and/or the transportation and support assembly 334 (e.g., be positioned below the transportation and support assembly 324 on the tower 302 and/or be positioned above the transportation and support assembly 334 on the tower 302), or may be instead of the transportation and support assembly 324 and/or the transportation and support assembly 334. It is noted herein the support assembly 400 may be removable from the media mast 106 and separately stowable or transportable.

The support assembly 400 may include a support shaft 402 coupled to the tower 302, the media bracket 304, and/or the main support shaft 312. For example, the support shaft 402 may couple to the tower 302 or a telescopic tower section of the tower 302. For instance, the support shaft 402 may include one or more holes 404 which may align with one or more holes 314 in the tower 302, with the one or more holes 310 in the main support shaft 312, and/or the one or more holes 308 in the media bracket assembly 304, where the one or more holes 308, 310, 314, 404 may be configured to receive fasteners including, but not limited to, screws; nuts, washers, and bolts; hitch and cotter pins; spring-loaded pistons; or the like. By way of another example, the support shaft 402 may fit over the tower 302 or a telescopic tower section of the tower 302. By way of another example, the support shaft 402 may fit within the tower 302. By way of another example, the support shaft 402 may be a telescopic tower section of the tower 302.

The support assembly 400 may include one or more support legs 406 coupled to the support shaft 402. For example, the one or more support legs 406 may be indirectly coupled to the support shaft 402. For instance, the one or more support legs 406 may be coupled to one or more auxiliary support brackets 408, and the one or more auxiliary support brackets 408 may be coupled to the support shaft 402. By way of another example, the one or more support legs 406 may be directly coupled to the support shaft 402.

The one or more support legs 406 may be configured to store against the tower 302 and unfold to make contact with a ground surface to provide increased stability and resistance against at least one applied force such as an internal force (e.g., unbalanced weight of components, or the like) or an external force (e.g., wind, a force applied by a user, or the like). For example, where the one or more support legs 406 are coupled to the tower 302 via the support shaft 402 a select distance about the ground surface, the one or more support legs 406 and the ground surface may form an angle between 0 and 90 degrees when the one or more support legs 406 are unfolded.

It is noted herein one or more components of the transportation and support assembly 324, the transportation and support assembly 334, and/or the support assembly 400 as described throughout the disclosure may be interchangeable, swappable, and/or otherwise configured to work together. In addition, it is noted herein the media mast 106 may not include any transportation and/or support assemblies (e.g., 324, 334, 400) coupled to the tower 302, such that the tower 302 may include the media bracket assembly 304 and/or components of the media bracket assembly 304, and may include one or more handles 342 and/or components for the one or more handles 342.

Referring in general to FIGS. 3A-4F, in another embodiment the media mast 106 includes one or more handles 342. The handle 342 may be open (e.g., similar to a hook or cane) or closed (e.g., similar to a D-handle). The handle 342 may be any two-dimensional shape, and have a select amount of thickness in a third dimension.

In one non-limiting example, the handle 342 may include one or more holes 344 configured to couple to the tower 302 or the media bracket assembly 304 via one or more fasteners (e.g., screws; nuts, washers, and bolts; hitch and cotter pins; spring-loaded pistons; or the like), an adhesive, or the like. For instance, the handle 342 may be inserted within the tower 302 or interface with one or more exterior surfaces of the tower 302. In addition, the handle 342 may be inserted within the media bracket assembly 304 or interface with one or more exterior surfaces of the media bracket assembly 304. Further, the handle 342 may be inserted within the main support shaft 312 or interface with one or more exterior surfaces of the main support shaft 312. Further, the one or more holes 344 of the handle 342 may be aligned with the one or more holes 314 of the tower 302, the one or more holes 310 of the main support shaft 312, and/or the one or more holes 308 of the media bracket assembly 304 to receive one or more fasteners. In another non-limiting example, a handle 342 may be coupled to one or more holes 346 in the baseplate 336 of the transportation and support assembly 334. In another non-limiting example, a handle 342 may be cut into the baseplate 336 of the transportation and support assembly 334.

It is noted herein the handle 342 and the collapsible (e.g., the tower 302 being collapsible with telescopic sections, the transportation and support assembly 400 being collapsible, or the like) and portable (e.g., the transportation and support assemblies 324, 334 including wheels) natures of the media mast 106 results in the media mast 106 having a compact hand-truck configuration for ease of mobility and use.

In addition, it is noted herein the compact hand-truck configuration allows for the media mast 106 to be used without the seating assembly 102 (e.g., in a standalone mode). Further, it is noted herein the compact hand-truck configuration allows for the media mast 106 to be coupled to assemblies other than the seating assembly 102, but instead to any assembly with a component capable of and/or configured to receive the media mast 106.

It is noted herein the media mast 106 may include one or more lock assemblies to keep the media mast 106 in an operational form and/or in a stowable or transportable form.

Referring in general to FIGS. 1A-4F, in another embodiment the seating apparatus 100 includes one or more accessory mounts or storage compartments 410. For example, the one or more accessory mounts or storage compartments 410 may be coupled to the media mast 106. For instance, the one or more accessory mounts or storage compartments 410 may be coupled to the baseplate 336 of the transportation and support assembly 334. In addition, the one or more accessory mounts or storage compartments 410 may be coupled to the tower 302. By way of another example, the one or more accessory mounts or storage compartments 410 may be coupled to the seating assembly 102.

The one or more accessory mounts or storage compartments 410 may include, but are not limited to, a storage unit or holster for storing the user input device (e.g., electronic tablet, customized electronic communication device, or the like) coupled to the display device or one or more marking devices for the markable surface (e.g., chalk, whiteboard markers, styluses, or the like) proximate to the display device, a mounting location for the user input device coupled to the display device, or the like.

Although embodiments of the present disclosure illustrate the seating apparatus 100 and/or components of the seating apparatus 100 as being transitioned between an operational form and a stowable or transportable form by a user unassisted, it is noted herein the seating apparatus 100 may include any number of components necessary to mechanically, fluidically (e.g., pneumatically or hydraulically), electrically assist the user in transitioning the seating apparatus 100 and/or the components of the seating apparatus 100 between the operational form and the stowable or transportable form. For example, the seating apparatus 100 may include, but is not limited to, motors, pistons, or the like to assist the user in transitioning the seating apparatus 100 and/or the components of the seating apparatus 100 between the operational form and the stowable or transportable form.

It is noted herein components of the seating apparatus 100 as described throughout the present disclosure may be understood as being mechanically coupled together, fluidically coupled together, electrically coupled together, communicatively coupled together, or the like.

Although embodiments of the present disclosure may be interpreted as actuating the seating apparatus 100 and/or components of the seating apparatus 100 via motions in select directions in a select listed order to transition the seating apparatus 100 and/or components of the seating apparatus 100 between an operational form and a stowable or transportable form, it is noted herein the motions in directions may occur in any order or simultaneously. In addition, although embodiments of the present disclosure may be interpreted as rotating the seating apparatus 100 and/or components of the seating apparatus 100 via the motions in directions in a select rotational direction, it is noted herein the motions in direction may be in either rotational direction. Therefore, the above description should not be interpreted as a limitation on the scope of the present disclosure but merely an illustration. Further, although embodiments of the present disclosure may be interpreted as rotating the seating apparatus 100 and/or components of the seating apparatus 100 via the motions in directions in a select translational direction, it is noted herein the motions in direction may be in any translational direction. Therefore, the above description should not be interpreted as a limitation on the scope of the present disclosure but merely an illustration.

Although embodiments of the present disclosure may be interpreted as the seating apparatus 100 and/or components of the seating apparatus 100 via motions including a single stowable or transportable form, it is noted herein the stowable form and the transportable form may be different. For example, the stowable form may be independent of or an intermediary during the transition between an operational form and a transportable form. By way of another example, the transportable form may be independent of or an intermediary during the transition between an operational form and a stowable form. Therefore, the above description should not be interpreted as a limitation on the scope of the present disclosure but merely an illustration.

As such, advantages of the present disclosure are directed to a collapsible and portable seating apparatus 100 usable in a variety of indoor and outdoor environments. Advantages of the present disclosure are also directed to the seating apparatus 100 including a seating assembly 102, a removable canopy 104, and a removable media mast 106. Advantages of the present disclosure are also directed to the processes of folding and/or expanding the seating apparatus 100, storage of the seating apparatus 100, removing and/or adding components (e.g., the media mast 106, the canopy 104, or the like) to the seating assembly 102 of the seating apparatus 100.

Advantages of the present disclosure are also directed to the media mast 106 being operated as a standalone device without the seating assembly and/or the removable canopy. The media mast 106 may be self-contained with all necessary electrical components or connections 110 capable of providing power, generating images, or other electrical-based operations. The media mast 106 is collapsible into a hand-truck configuration, or supported via one or more support assemblies 324, 334, 400, and/or may be portable via the one or more transportation assemblies 324, 334, where the one or more support assemblies 324, 334, 400 and the one or more transportation assemblies 324, 334 may be separate or integrated together.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top", "bottom", "over", "under", "upper", "upward", "lower", "down", and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, or the like. Furthermore, the results may be stored "permanently", "semi-permanently", temporarily ", or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to", the term "having" should be interpreted as "having at least", the term "includes" should be interpreted as "includes but is not limited to", or the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations", without other modifiers, typically means at least two recitations, or two or more recitations). Furthermore, in those instances where a convention analogous to "at least one of A, B, and C, or the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, or the like). In those instances where a convention analogous to "at least one of A, B, or C, or the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, or the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A seating apparatus comprising:

a media mast comprising:

a tower including at least one tower section;

a media bracket assembly, wherein the media bracket assembly comprises at least one device mount coupled to the tower; and at least one transportation or support assembly coupled to the tower, wherein the at least one transportation or support assembly is configured to provide resistance to the media mast; and a seating assembly, wherein the seating assembly is configured to transition between a stowable or transportable form and an operational form, wherein the seating assembly comprises:

a frame;

a first seat and at least a second seat coupled to the frame;

at least one leg assembly coupled to the frame via at least one linkage assembly, wherein the at least one leg assembly is collapsible at the at least one linkage assembly;

at least one wheel assembly coupled to the frame via at least one pivot assembly, wherein the frame is collapsible at the at least one pivot assembly, wherein the seating assembly is portable via the at least one wheel assembly; and a media mast member coupled to the frame, wherein the media mast is configured to be removable from and couplable to the media mast member.

2. The seating apparatus of claim 1, wherein the first seat and the at least a second seat is configured to actuate with the frame when the seating assembly transitions between the stowable or transportable form and the operational form, wherein the at least one leg assembly is configured to actuate relative to the frame when the seating assembly transitions between the stowable or transportable form and the operational form, wherein the frame is configured to actuate relative to the at least one wheel assembly when the seating assembly transitions between the stowable or transportable form and the operational form.

3. The seating apparatus of claim 1, wherein one or more of the at least one leg assembly or the at least one wheel assembly includes at least one ground sleeve, wherein the at least one ground sleeve is configured to engage the ground surface by being insertable into at least one of the ground surface, a receiver positioned in the ground surface, or the receiver positioned on the ground surface, wherein the at least one ground sleeve is configured to provide increased stability and resistance to the seating assembly against the at least one applied force when the at least one ground sleeve engages the ground surface.

4. The seating apparatus of claim 1, wherein the at least one tower section is configured to engage the ground surface by being insertable into at least one of the ground surface, a receiver positioned in the ground surface, or the receiver positioned on the ground surface, wherein the at least one tower section is configured to provide increased stability and resistance to the seating assembly against the at least one applied force when the media mast is positioned on the ground surface and the at least one tower section engages the ground surface.

5. The seating apparatus of claim 1, wherein the media bracket assembly further comprises:

at least one electronics bracket coupled to the tower, wherein the at least one electronics bracket is configured to receive one or more electrical components that are couplable to the at least one electronics bracket, wherein the one or more electrical components are configured to power the at least one image generation device.

6. The seating apparatus of claim 5, wherein the one or more electrical components include a battery pack, wherein the battery pack is chargeable via at least one of an external power grid or one or more onboard solar panels.

7. The seating apparatus of claim 1, wherein the media mast further comprises:

a handle coupled to the tower.

8. The seating apparatus of claim 1, wherein the at least one transportation or support assembly comprises:

a main support shaft coupled to the tower;

at least one wheel coupled to the main support shaft via at least one bracket; and at least one support frame coupled to the main support shaft, wherein the at least one support frame is configured to engage the ground surface by coming into contact with the ground surface when the media mast is positioned on the ground surface, wherein the at least one support frame is configured to provide increased stability and resistance to the seating assembly against the at least one applied force when the media mast is positioned on the ground surface and the at least one support frame engages the ground surface.

9. The seating apparatus of claim 8, wherein the at least one wheel is coupled to the at least one bracket via an axle.

10. The seating apparatus of claim 1, wherein the at least one transportation or support assembly comprises:

a baseplate including a receiver, wherein the tower is configured to couple to the receiver; and at least one wheel coupled to the baseplate via at least one bracket.

11. The seating apparatus of claim 10, wherein the at least one transportation or support assembly comprises:

at least one accessory mount or storage compartment coupled to the baseplate.

12. The seating apparatus of claim 10, wherein at least a portion of the tower is configured to pass through the baseplate and the receiver, wherein the at least a portion of the tower is configured to engage the ground surface by being insertable into at least one of the ground surface, the receiver positioned in the ground surface, or the receiver positioned on the ground surface, wherein the at least a portion of the tower is configured to provide increased stability and resistance to the seating assembly against the at least one applied force when the media mast is positioned on the ground surface and the at least a portion of the tower engages the ground surface.

13. The seating apparatus of claim 1, wherein the at least one transportation or support assembly comprises:

a support shaft coupled to the tower;

at least one auxiliary support bracket coupled to the support shaft; and at least one support leg coupled to the at least one auxiliary support bracket, wherein the at least one support leg is configured to transition between a stowable or transportable form and an operational form, wherein the at least one support leg is configured to engage the ground surface by coming into contact with the ground surface when in the operational form, wherein the at least one support leg is configured to provide increased stability and resistance to the seating assembly against the at least one applied force when the media mast is positioned on the ground surface and the at least one support leg engages the ground surface.

14. The seating apparatus of claim 1, further comprising:

a canopy coupled to the seating assembly.

15. The seating apparatus of claim 14, the seating assembly further comprising:

at least one canopy support assembly, wherein the at least one canopy support assembly is configured to transition between a stowable or transportable form and an operational form, wherein the canopy is configured to be removable from and couplable to the at least one canopy support assembly when the at least one canopy support assembly is in the operational form.

16. The seating apparatus of claim 15, wherein the at least one canopy support assembly comprises:

at least one canopy support; and at least one bracket coupled to the frame, wherein the at least one canopy support is configured to rotate about an axis through the at least one bracket when the at least one canopy support assembly transitions between the stowable or transportable form and the operational form.

17. The seating apparatus of claim 14, wherein the canopy is sloped at an angle relative to the ground surface to allow for fluid run-off from the canopy.

18. The seating apparatus of claim 1, wherein the first seat is coupled to a first section of the frame, wherein the at least a second seat is coupled to a second section of the frame, wherein the media mast member is coupled to a third section of the frame, wherein the third section of the frame couples the first second of the frame and the second section of the frame.

19. A seating apparatus, comprising:

a media mast, comprising:

a tower including at least one tower section;

a media bracket assembly, wherein the media bracket assembly comprises:

at least one device mount coupled to the tower; and at least one electronics bracket coupled to the tower, wherein the at least one electronics bracket is configured to receive one or more electrical components that are couplable to the at least one electronics bracket;

at least one transportation or support assembly coupled to the tower, wherein the at least one transportation or support assembly is configured to provide resistance to the media mast; and a seating assembly, wherein the seating assembly is configured to transition between a stowable or transportable form and an operational form, wherein the seating assembly comprises:

a frame;

a first seat and at least a second seat coupled to the frame;

at least one leg assembly coupled to the frame via at least one linkage assembly, wherein the at least one leg assembly is collapsible at the at least one linkage assembly; and at least one wheel assembly coupled to the frame via at least one pivot assembly, wherein the frame is collapsible at the at least one pivot assembly, wherein the seating assembly is portable via the at least one wheel assembly.

20. A media mast, comprising:

a tower including at least one tower section;

a media bracket assembly, wherein the media bracket assembly comprises:

at least one device mount coupled to the tower; and at least one electronics bracket coupled to the tower, wherein the at least one electronics bracket is configured to receive one or more electrical components that are couplable to the at least one electronics bracket; and at least one transportation or support assembly coupled to the tower, wherein the at least one transportation or support assembly is configured to provide resistance to the media mast against at least one applied force, wherein the media mast is configured to be removable from and couplable to a media mast member installed on a seating assembly of a collapsible and portable seating apparatus, wherein the seating assembly is configured to transition between a stowable or transportable form and an operational form.

* * * * *